(12) United States Patent
Kim et al.

(10) Patent No.: US 8,098,946 B2
(45) Date of Patent: Jan. 17, 2012

(54) APPARATUS AND METHOD FOR IMAGE ENCODING AND DECODING USING PREDICTION

(75) Inventors: So-young Kim, Yongin-si (KR);
Jeong-hoon Park, Seoul (KR);
Sang-rae Lee, Suwon-si (KR);
Jae-chool Lee, Suwon-si (KR); Yu-mi Sohn, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1047 days.

(21) Appl. No.: 11/593,526

(22) Filed: Nov. 7, 2006

(65) Prior Publication Data

US 2007/0104379 A1 May 10, 2007

(30) Foreign Application Priority Data

Nov. 9, 2005 (KR) .................. 10-2005-0107001

(51) Int. Cl.
*G06K 9/36* (2006.01)
*G06K 9/46* (2006.01)
(52) U.S. Cl. .................. 382/238; 382/232; 382/236
(58) Field of Classification Search .................. 382/232, 382/236, 238, 240; 375/240.16
See application file for complete search history.

(56) References Cited

U.S. PATENT DOCUMENTS

| 5,812,788 | A  | * | 9/1998  | Agarwal      | 709/247    |
| 6,272,179 | B1 | * | 8/2001  | Kadono       | 375/240.16 |
| 6,359,929 | B1 | * | 3/2002  | Boon         | 375/240.16 |
| 7,453,941 | B1 | * | 11/2008 | Yamori et al.| 375/240.15 |
| 2005/0100097 | A1 | * | 5/2005 | Yoo       | 375/240.16 |
| 2005/0226335 | A1 | * | 10/2005 | Lee et al.| 375/240.16 |
| 2006/0088102 | A1 | * | 4/2006 | Lee et al.| 375/240.16 |

FOREIGN PATENT DOCUMENTS

| JP | 8-242446 A    | 9/1996  |
| JP | 8-307865 A    | 11/1996 |
| JP | 2000-270332 A | 9/2000  |
| KR | 0153418 B1    | 7/1998  |
| KR | 1020050012853 | 2/2005  |

OTHER PUBLICATIONS

English translation of Japanese Patent Application No. 08-307865, published Nov. 22, 1996. IDS.*

* cited by examiner

*Primary Examiner* — Samir Ahmed
*Assistant Examiner* — Li Liu
(74) *Attorney, Agent, or Firm* — Sughrue Mion, PLLC

(57) ABSTRACT

An image encoding and decoding method includes dividing an input image into a plurality of sub-planes by sub-sampling the input image, selecting one of the divided sub-planes and performing interprediction-encoding on the selected sub-plane, and performing interprediction-encoding on the remaining sub-planes based on motion vectors selected in interprediction-encoding of the selected sub-plane.

68 Claims, 16 Drawing Sheets

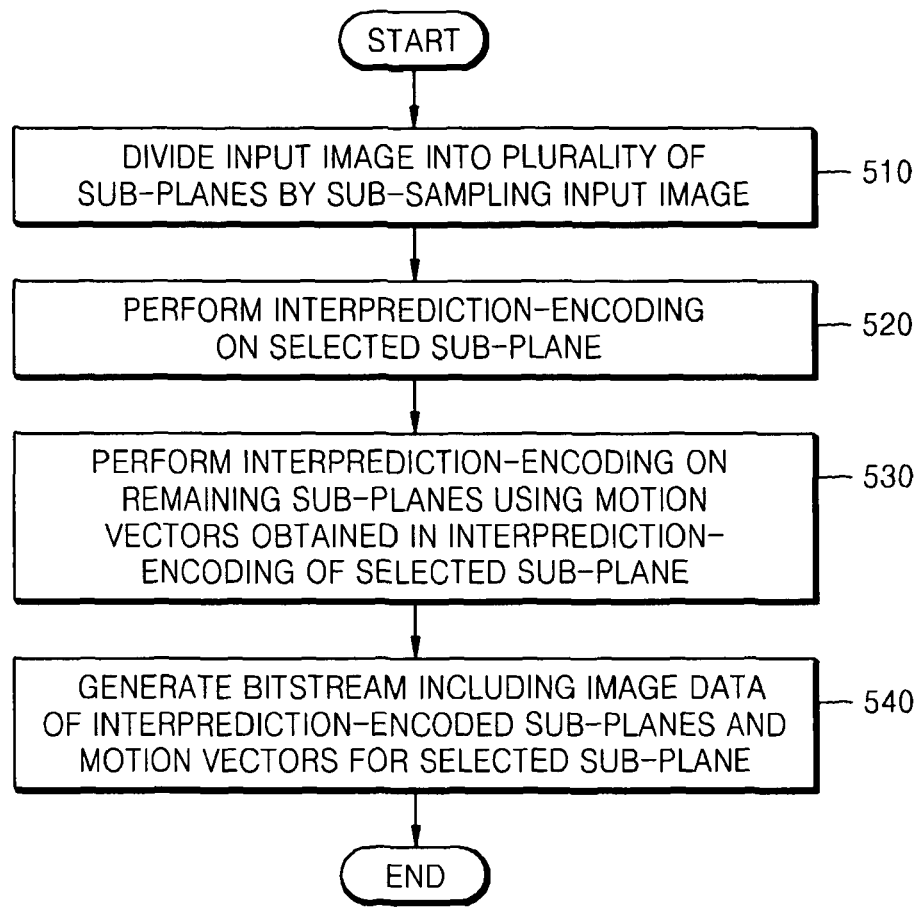

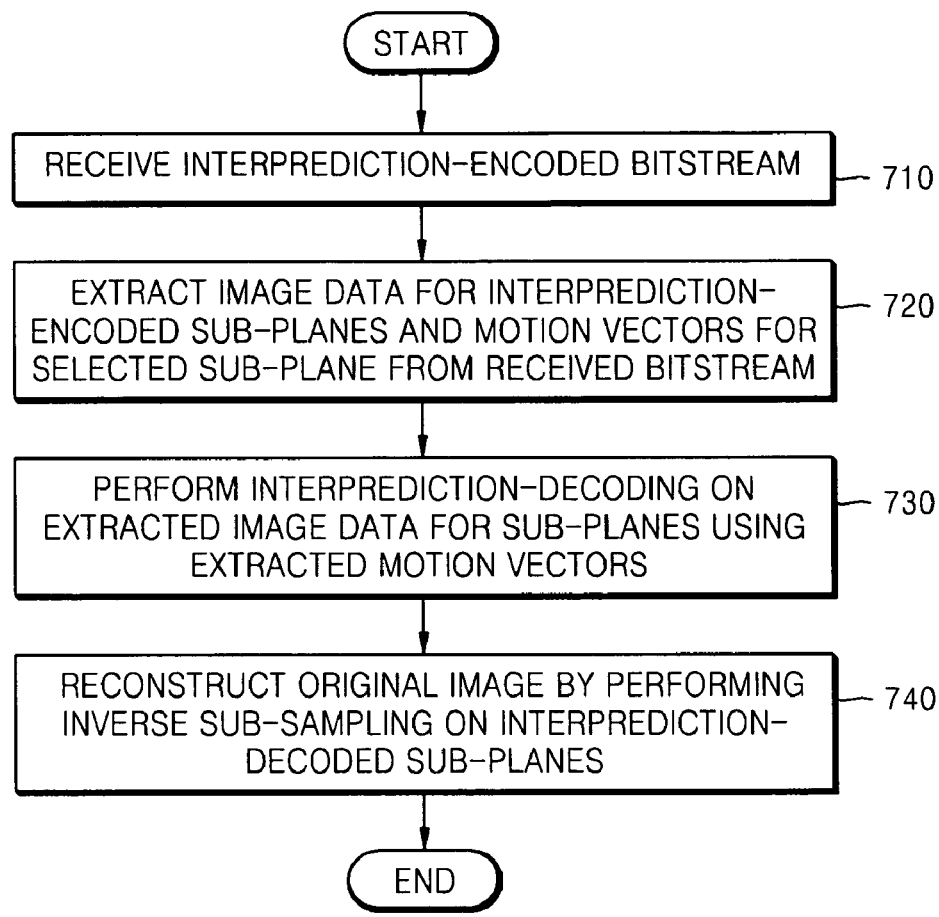
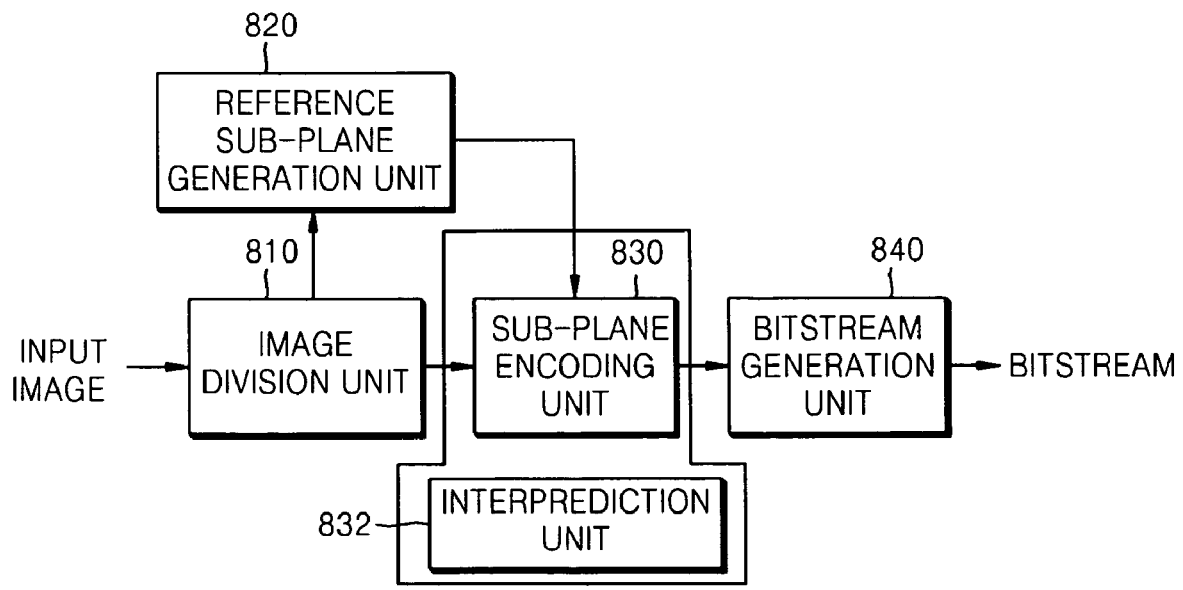

APPARATUS AND METHOD FOR IMAGE ENCODING AND DECODING USING PREDICTION

CROSS-REFERENCE TO RELATED PATENT APPLICATION

This application claims priority from Korean Patent Application No. 10-2005-0107001, filed on Nov. 9, 2005, in the Korean Intellectual Property Office, the disclosure of which is incorporated herein in its entirety by reference.

BACKGROUND OF THE INVENTION

1. Field of the Invention

The present invention relates to image compression encoding, and more particularly, to a prediction method for an inter-picture which improves image compression efficiency, and an apparatus and method for image encoding/decoding using the prediction method.

2. Description of the Related Art

In video compression standards such as moving picture expert group (MPEG) MPEG-1, MPEG-2, MPEG-4 Visual, H.261, H.263, and H.264 standards, an image is compressed through interprediction that refers to previous or following pictures for video encoding.

FIG. 1 is an illustration for explaining a conventional interprediction method. A conventional encoder calculates a motion vector for a macroblock within a frame to be interpredicted, i.e., a prediction frame 110. The encoder does a search in a search area 122 of a reference frame 120 for interprediction. To search in the search area 122 for a candidate macroblock that is best matched with a current macroblock 112 of the prediction frame 110, the encoder compares the current macroblock 112 with a plurality of candidate macroblocks in the search area 122. The encoder outputs information indicating an entropy-encoded motion vector for the best matched macroblock.

Since a motion vector correlates with its surrounding motion vectors, data used for transmission of motion vector information is compressed by selecting a motion vector predictor from neighboring macroblocks of a current macroblock and predicting a motion vector for the current macroblock using the selected motion vector predictor. The encoder encodes a difference between the predicted motion vector and the selected motion vector predictor. A decoder adds the difference to the motion vector predictor to reconstruct a motion vector and calculates a prediction macroblock for the current macroblock 112 using the reconstructed motion vector based on information of the previously reconstructed reference frame 120. Since the prediction macroblock obtained through interprediction is not completely matched with the current macroblock 112, the encoder obtains and encodes an error block or a residual block including a pixel difference between the prediction macroblock and the current macroblock 112.

However, there is a need for an improved encoding method capable of improving compression efficiency to provide high-definition videos to users using a fixed bandwidth.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

The present invention provides an apparatus and method for image encoding/decoding to improve compression efficiency in interprediction encoding.

According to one aspect of the present invention, there is provided an image encoding method including dividing an input image into a plurality of sub-planes by sub-sampling the input image, selecting one of the divided sub-planes and performing interprediction-encoding on the selected sub-plane, and performing interprediction-encoding on the remaining sub-planes based on motion vectors obtained in interprediction-encoding of the selected sub-plane.

According to another aspect of the present invention, there is provided an image encoder including an image division unit and a sub-plane encoding unit. The image division unit divides an input image into a plurality of sub-planes by sub-sampling the input image. The sub-plane encoding unit selects one of the divided sub-planes, performs interprediction-encoding on the selected sub-plane, and performs interprediction-encoding on the remaining sub-planes based on motion vectors obtained in interprediction-encoding of the selected sub-plane.

According to still another aspect of the present invention, there is provided an image encoding method including dividing an input image into a plurality of sub-planes by sub-sampling the input image, generating a reference sub-plane for a current image based on the divided sub-planes, performing interprediction-encoding on the generated reference sub-plane for the current image, and performing interprediction-encoding on the divided sub-planes based on motion vectors obtained in the interprediction-encoding of the generated reference sub-plane.

According to yet another aspect of the present invention, there is provided an image encoder including an image division unit, a reference sub-plane generation unit, and a sub-plane encoding unit. The image division unit divides an input image into a plurality of sub-planes by sub-sampling the input image. The reference sub-plane generation unit generates a reference sub-plane for a current image based on the divided sub-planes. The sub-plane encoding unit performs interprediction-encoding on the generated reference sub-plane for the current image and performs interprediction-encoding on the divided sub-planes based on motion vectors obtained in the interprediction-encoding of the generated reference sub-plane.

According to yet another aspect of the present invention, there is provided an image encoding method including dividing an input image into a plurality of sub-planes by sub-sampling the input image, selecting one of the divided sub-planes and performing interprediction-encoding on the selected sub-plane, and performing interprediction-encoding on the remaining sub-planes using the selected sub-plane as a reference sub-plane.

According to yet another aspect of the present invention, there is provided an image encoder including an image division unit and a sub-plane encoding unit. The image division unit divides an input image into a plurality of sub-planes by sub-sampling the input image. The sub-plane encoding unit selects one of the divided sub-planes, performs interprediction-encoding on the selected sub-plane, and performs interprediction-encoding on the remaining sub-planes using the selected sub-plane as a reference sub-plane.

According to yet another aspect of the present invention, there is provided an image encoding method including dividing an input image into a plurality of sub-planes by sub-sampling the input image, performing first interprediction-encoding on the divided sub-planes, selecting one of the sub-planes that undergo the first interprediction-encoding, and performing second interprediction-encoding on the remaining sub-planes that undergo the first interprediction-encoding using the selected sub-plane that undergoes the first interprediction-encoding as a reference sub-plane.

According to yet another aspect of the present invention, there is provided an image encoder including an image division unit, a first interprediction-encoding unit, and a second interprediction-encoding unit. The image division unit divides an input image into a plurality of sub-planes by sub-sampling the input image. The first interprediction-encoding unit performs first interprediction-encoding on the divided sub-planes. The second interprediction-encoding unit selects one of the sub-planes that undergo the first interprediction-encoding and performing second interprediction-encoding on the remaining sub-planes that undergo the first interprediction-encoding using the selected sub-plane that undergoes the first interprediction-encoding as a reference sub-plane.

According to yet another aspect of the present invention, there is provided an image decoding method including receiving an encoded bitstream including image data obtained by selecting one of sub-planes obtained by sub-sampling an input image and performing interprediction-encoding on the selected sub-plane, image data obtained by performing interprediction-encoding on the remaining sub-planes based on motion vectors selected in interprediction-encoding of the selected sub-plane, and motion vectors for the selected sub-plane, extracting the image data for the interprediction-encoded sub-planes and the motion vectors for the selected sub-plane from the received bitstream, and performing interprediction-decoding on the extracted image data for the interprediction-encoded sub-planes using the extracted motion vectors for the selected sub-plane.

According to yet another aspect of the present invention, there is provided an image decoder including an image data extraction unit and an interprediction-decoding unit. The image data extraction unit receives an encoded bitstream including image data obtained by selecting one of sub-planes obtained by sub-sampling an input image and performing interprediction-encoding on the selected sub-plane, image data obtained by performing interprediction-encoding on the remaining sub-planes based on motion vectors selected in interprediction-encoding of the selected sub-plane, and motion vectors for the selected sub-plane, and extracts the image data for the interprediction-encoded sub-planes and the motion vectors for the selected sub-plane from the received bitstream. The interprediction-decoding unit performs interprediction-decoding on the extracted image data for the interprediction-encoded sub-planes using the extracted motion vectors for the selected sub-plane.

According to yet another aspect of the present invention, there is provided an image decoding method including receiving an encoded bitstream including image data obtained by generating a reference sub-plane for a current image based on a plurality of sub-planes obtained by sub-sampling an input image, performing interprediction-encoding on the generated reference sub-plane for the current image, and performing interprediction-encoding on the remaining sub-planes based on motion vectors selected in interprediction-encoding of the generated reference sub-plane and the motion vectors selected in interprediction-encoding of the generated reference sub-plane, extracting the image data for the interprediction-encoded sub-planes and the motion vectors for the generated reference sub-plane from the received bitstream, and performing interprediction-decoding on the extracted image data of the divided sub-planes using the extracted motion vectors.

According to yet another aspect of the present invention, there is provided an image decoder including an image data extraction unit and an interprediction-decoding unit. The image data extraction unit receives an encoded bitstream including image data obtained by generating a reference sub-plane for a current image based on a plurality of sub-planes obtained by sub-sampling an input image, performing interprediction-encoding on the generated reference sub-plane for the current image, and performing interprediction-encoding on the remaining sub-planes based on motion vectors selected in interprediction-encoding of the generated reference sub-plane and the motion vectors selected in interprediction-encoding of the generated reference sub-plane, and extracts the image data for the interprediction-encoded sub-planes and the motion vectors for the generated reference sub-plane from the received bitstream. The interprediction-decoding unit performs interprediction-decoding on the extracted image data of the divided sub-planes using the extracted motion vectors.

According to yet another aspect of the present invention, there is provided an image decoding method including receiving an encoded bitstream including image data obtained by selecting one of sub-planes obtained by sub-sampling an input image and performing interprediction-encoding on the selected sub-plane, image data obtained by performing interprediction-encoding on the remaining sub-planes using the selected sub-plane as a reference sub-plane, and motion vectors for interprediction-encoding of the divided sub-planes, extracting the image data for the interprediction-encoded sub-planes and the motion vectors for the divided sub-planes from the received bitstream, performing interprediction-decoding on the extracted image data for the selected sub-plane, and performing interprediction-decoding on the extracted image data for the remaining sub-planes using the interprediction-decoded sub-plane as a reference sub-plane.

According to yet another aspect of the present invention, there is provided an image decoder including an image data extraction unit and an interprediction-decoding unit. The image data extraction unit receives an encoded bitstream including image data obtained by selecting one of sub-planes obtained by sub-sampling an input image and performing interprediction-encoding on the selected sub-plane, image data obtained by performing interprediction-encoding on the remaining sub-planes using the selected sub-plane as a reference sub-plane, and motion vectors for interprediction-encoding of the divided sub-planes, and extracts the image data for the interprediction-encoded sub-planes and the motion vectors for the divided sub-planes from the received bitstream. The interprediction-decoding unit performs interprediction-decoding on the extracted image data for the selected sub-plane and performs interprediction-decoding on the extracted image data for the remaining sub-planes using the interprediction-decoded sub-plane as a reference sub-plane.

According to yet another aspect of the present invention, there is provided an image decoding method including receiving an encoded bitstream including image data obtained by performing first interprediction-encoding on a plurality of sub-planes obtained by sub-sampling an input image, selecting one of the sub-planes that undergo the first interprediction-encoding, and performing second interprediction-encoding on the remaining sub-planes using the selected sub-plane that undergoes the first interprediction-encoding as a reference sub-plane, image data for the selected sub-plane, and motion vectors selected in the first interprediction-encoding of the divided sub-planes, extracting the image data for the interprediction-encoded sub-planes and the motion vectors for the interprediction-encoded sub-planes from the received bitstream, performing first interprediction-decoding on the image data for the remaining sub-planes using the extracted image data for the selected sub-plane as a reference image, and performing second interprediction-decoding on the image data for the selected sub-plane and the image data for the remaining sub-planes that undergo the first interprediction-decoding using the extracted motion vectors.

According to yet another aspect of the present invention, there is provided an image decoder including an image data extraction unit, a first interprediction-decoding unit, and a second interprediction-decoding unit. The image data extraction unit receives an encoded bitstream including image data obtained by performing first interprediction-encoding on a plurality of sub-planes obtained by sub-sampling an input image, selecting one of the sub-planes that undergo the first interprediction-encoding, and performing second interprediction-encoding on the remaining sub-planes using the selected sub-plane that undergoes the first interprediction-encoding as a reference sub-plane, image data for the selected sub-plane, and motion vectors selected in the first interprediction-encoding of the divided sub-planes, and extracts the image data for the interprediction-encoded sub-planes and the motion vectors for the interprediction-encoded sub-planes from the received bitstream. The first interprediction-decoding unit performs first interprediction-decoding on the image data for the remaining sub-planes using the extracted image data for the selected sub-plane as a reference image. The second interprediction-decoding unit performs second interprediction-decoding on the image data for the selected sub-plane and the image data for the remaining sub-planes that undergo the first interprediction-decoding using the extracted motion vectors.

BRIEF DESCRIPTION OF THE DRAWINGS

The above and other features and advantages of the present invention will become more apparent by describing in detail exemplary embodiments thereof with reference to the attached drawings in which:

FIG. 5 is a flowchart illustrating an image encoding method implemented by the image encoder of FIG. 2;

FIG. 6 is a block diagram of an image decoder according to exemplary embodiments of the present invention;

FIG. 7 is a flowchart illustrating an image decoding method implemented by the image decoder of FIG. 6;

FIG. 8 is a block diagram of an image encoder according to a second exemplary embodiment of the present invention;

DETAILED DESCRIPTION OF THE INVENTION

Figure 1:
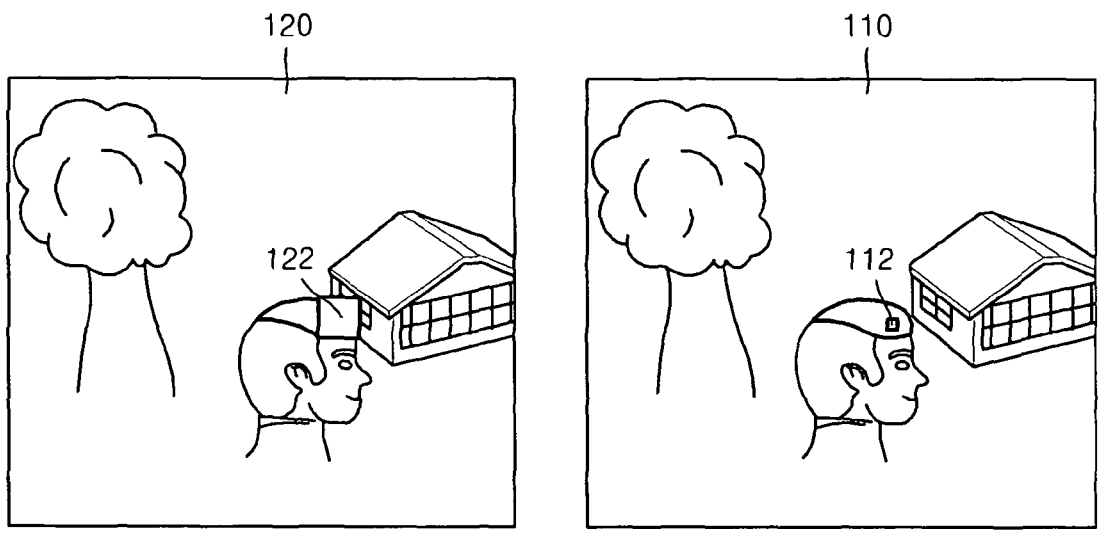
FIG. 1 is an illustration for explaining a conventional interprediction method.
Figure 2:
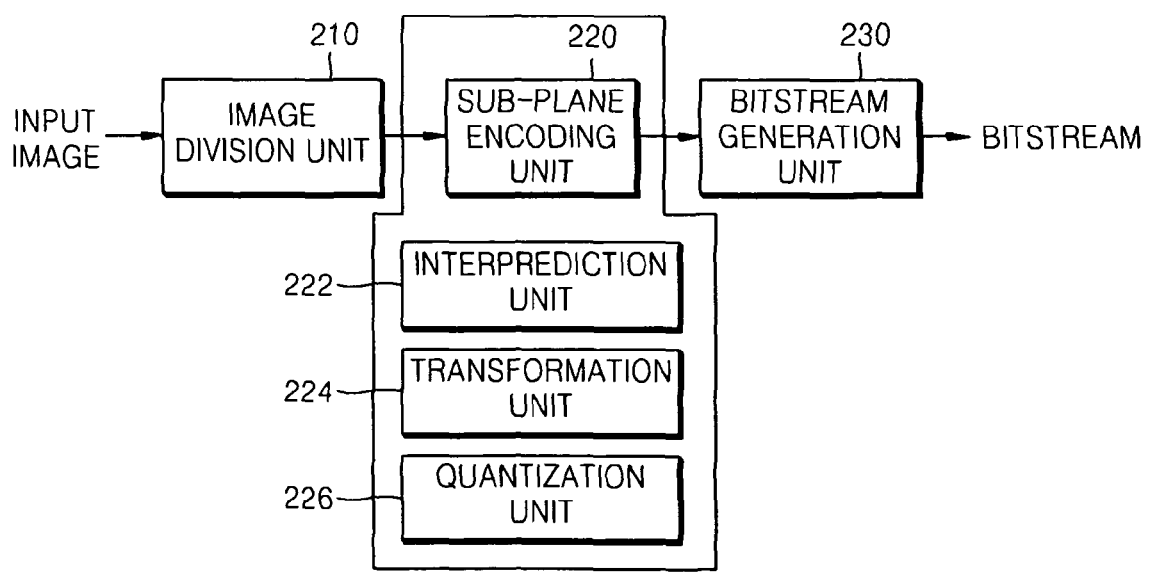
FIG. 2 is a block diagram of an image encoder according to exemplary embodiments of the present invention.

FIG. 2 is a block diagram of an image encoder according to exemplary embodiments of the present invention.

Referring to FIG. 2, the image encoder includes an image division unit 210, a sub-plane encoding unit 220, and a bitstream generation unit 230. The sub-plane encoding unit 220 may further include an interprediction unit 222. In addition, the sub-plane encoding unit 220 may further include a transformation unit 224 and a quantization unit 226 for performing transformation and quantization on sub-plane encoded image data.

Figure 3:
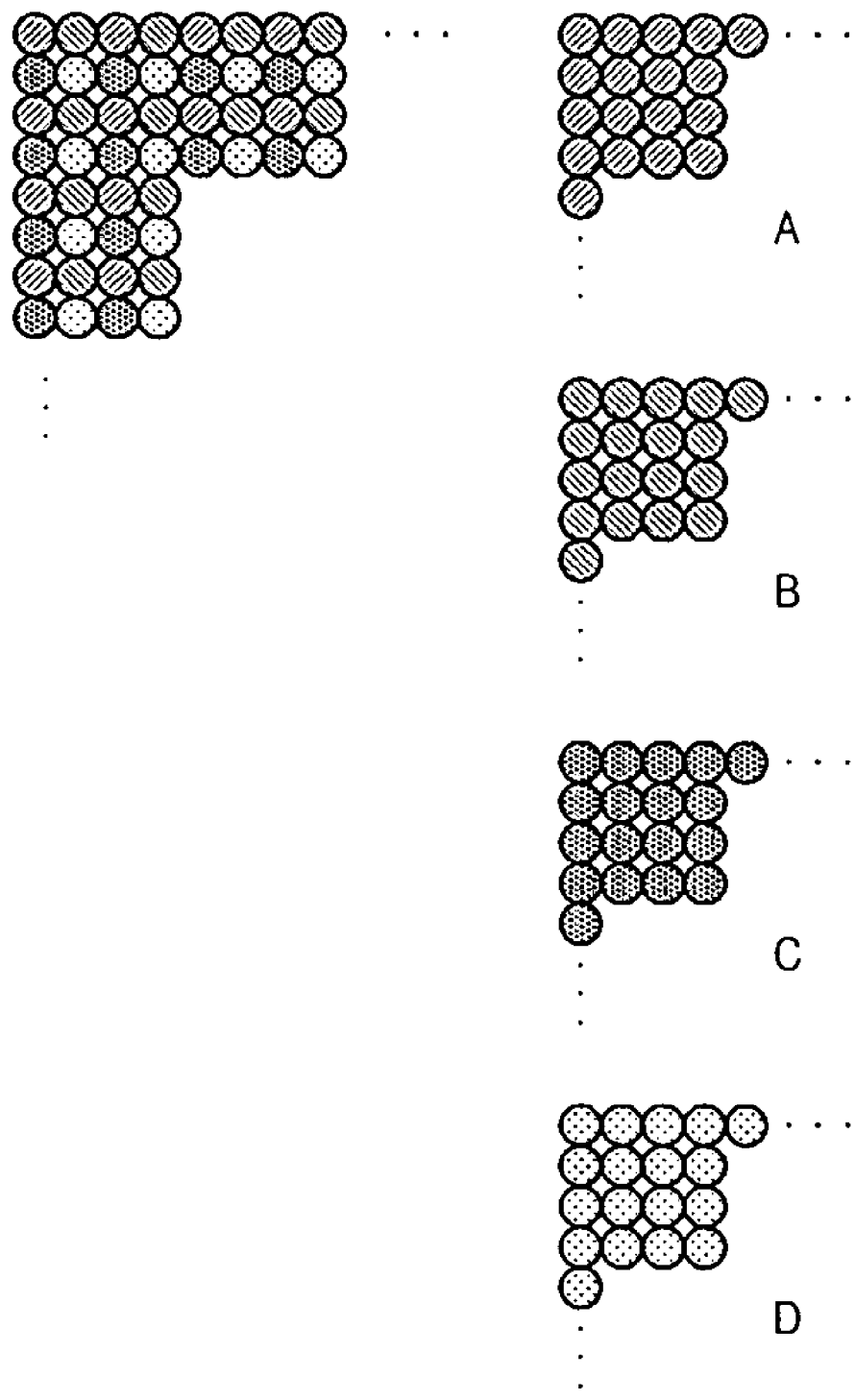
FIG. 3 is an illustration for explaining sub-sampling according to exemplary embodiments of the present invention.

Hereinafter, the image encoder will be described with reference to FIGS. 3 and 4. FIG. 3 is an illustration for explaining sub-sampling according to exemplary embodiments of the present invention, and FIG. 4 is an illustration for explaining interprediction according to a first exemplary embodiment of the present invention.

Figure 4:
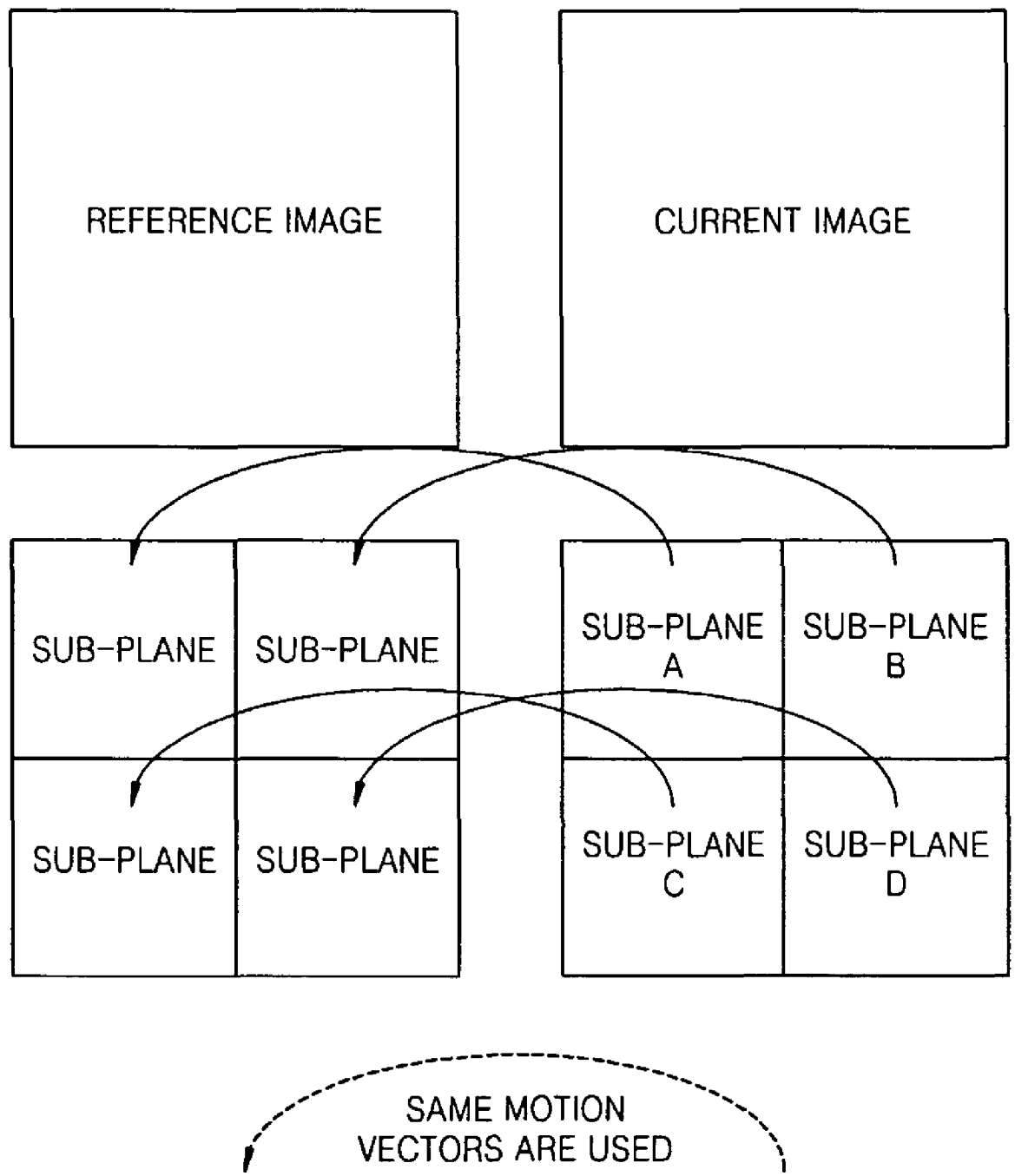
FIG. 4 is an illustration for explaining interprediction-encoding according to a first exemplary embodiment of the present invention.

The image division unit 210 (see FIG. 2) divides an input image into a plurality of sub-planes, e.g., four sub-planes A, B, C, and D as illustrated in FIG. 4, by sub-sampling the input image. For example, when an input image is in a common intermediate format (CIF) having a size of 352×288 pixels, it is divided into four 176×144 pixel sub-planes.

While an input image is divided into four sub-planes in the current exemplary embodiment of the present invention for convenience of explanation, it may be divided into sub-planes of various sizes.

The interprediction unit 222 of the sub-plane encoding unit 220 selects one of the divided sub-planes, e.g., the sub-plane A, and performs interprediction-encoding on the selected sub-plane A using divided sub-planes of a previous input image as reference sub-planes. For example, when interprediction-encoding is performed on each macroblock, a motion vector is selected for each macroblock and interprediction-encoding is performed using the selected motion vector.

Interprediction-encoding may be performed according to a conventional interprediction method and a detailed description thereof will not be provided. For example, interprediction-encoding of the selected sub-plane A includes selecting a motion vector for each of macroblocks of the sub-plane A, performing motion compensation based on the selected motion vector, generating a residual block including a difference between a motion-compensated macroblock and the original macroblock, transforming the residual block, quantizing the transformed residual block, and performing entropy-encoding on coefficients of the quantized residual block.

The sub-plane encoding unit 220 performs interprediction-encoding on the remaining sub-planes B, C, and D using motion vectors selected in interprediction-encoding of the selected sub-plane A. In other words, interprediction-encoding is performed on the macroblocks of the sub-planes B, C, and D illustrated in FIG. 4 using the motion vectors selected in interprediction-encoding of the selected sub-plane A. By using the same motion vectors for the sub-planes A, B, C, and D, the number of bits representing motion vectors to be transmitted with interprediction-encoded image data can be reduced. While interprediction-encoding is performed on each macroblock and a motion vector is selected for each macroblock in the current exemplary embodiment of the present invention, a motion vector may be selected for each block of a predetermined size.

Since the sub-planes A, B, C, and D are obtained by sub-sampling the input image, the same motion vectors can be shared among the sub-planes A, B, C, and D.

Thus, when the sub-plane encoding unit 220 further includes an entropy-encoder, the entropy-encoder performs entropy-encoding only on image data of the interprediction-encoded sub-planes A through D and motion vectors for the selected sub-plane A.

The bitstream generation unit 230 generates a bitstream including the image data of the interprediction-encoded sub-planes A through D and the motion vectors selected for interprediction-encoding of the selected sub-plane A. The bitstream does not include the motion vectors for the remaining sub-planes B through D because the remaining sub-planes B through D share the same motion vectors with the selected sub-plane A. Since the motion vectors for the remaining sub-planes B through D are not transmitted, the number of bits to be transmitted can be reduced.

In construction of the bitstream, mode information indicating a sub-plane encoding method, e.g., the size of a divided sub-plane, information specifying a selected sub-plane, and transformation and quantization methods may be included in an image header of the bitstream.

FIG. 5 is a flowchart illustrating an image encoding method implemented by the image encoder of FIG. 2.

In operation 510, an input image is divided into a plurality of sub-planes, e.g., four sub-planes A, B, C, and D as illustrated in FIG. 3, by sub-sampling the input image.

In operation 520, one of the divided sub-planes, e.g., the sub-plane A, is selected and interprediction-encoding is performed on the selected sub-plane A.

In operation 530, interprediction-encoding is performed on the remaining sub-planes B through D using motion vectors selected in interprediction-encoding of the selected sub-plane A.

In operation 540, a bitstream including image data of the interprediction-encoded sub-planes A through D and the motion vectors for the selected sub-plane A among motion vectors for interprediction-encoding of the sub-planes A through D is generated. In this way, the motion vectors for interprediction-encoding of the remaining sub-planes B through D are not transmitted, thereby improving compression efficiency. In construction of the bitstream, mode information indicating a sub-plane encoding method, e.g., the size of a divided sub-plane, information specifying a sub-plane to be transmitted, and transformation and quantization methods may be included in an image header of the bitstream. A process of entropy-encoding the image data of the interprediction-encoded sub-planes A through D and the motion vectors for the selected sub-plane A may be further included.

FIG. 6 is a block diagram of an image decoder according to exemplary embodiments of the present invention. Referring to FIG. 6, the image decoder includes an image data extraction unit 610, a sub-plane decoding unit 620, and an image reconstruction unit 630. The sub-plane decoding unit 620 may further include an interprediction unit 622. In addition, the sub-plane decoding unit 620 may further include an inverse quantization unit 624 and an inverse transformation unit 626.

The image data extraction unit 610 receives an encoded bitstream, extracts image data for the sub-planes A through D and motion vectors for the selected sub-plane A, and transmits the extracted image data and motion vectors to the sub-plane decoding unit 620. The encoded bitstream includes image data obtained by selecting one of the sub-planes A through D obtained by sub-sampling the input image, e.g., the sub-plane A, and performing interprediction-encoding on the selected sub-plane A, image data obtained by performing interprediction-encoding on the remaining sub-planes B through D based on the motion vectors selected in interprediction-encoding of the selected sub-plane A, and the motion vectors for the selected sub-plane A.

When mode information indicating an encoding method, e.g., a sub-plane division method, an interprediction method, and a scan mode is included in an image header of the encoded bitstream, the image header is parsed to extract the mode information. In addition, entropy-decoding may be performed.

In the current exemplary embodiment of the present invention, an input image is divided into four sub-planes A through D, i.e., the received encoded bitstream includes image data for the sub-planes A through D and motion vectors for the selected sub-plane A.

The interprediction unit 622 of the sub-plane decoding unit 620 performs interprediction-decoding on the extracted image data for the sub-planes A through D using the extracted motion vectors of the selected sub-plane A. When the mode information is included in the image header of the received bitstream, interprediction-decoding may be performed based on the mode information. When the extracted image data is transformed and quantized, inverse quantization and inverse transformation may be performed.

The image reconstruction unit 630 reconstructs the original image through inverse sub-sampling based on the image data for the sub-planes A through D that is interprediction-decoded by the sub-plane decoding unit 620.

FIG. 7 is a flowchart illustrating an image decoding method implemented by the image decoder of FIG. 6.

In operation 710, an encoded bitstream including image data obtained by selecting one of the sub-planes A through D obtained by sub-sampling the input image, e.g., the sub-plane A, and performing interprediction-encoding on the selected sub-plane A, image data obtained by performing interprediction-encoding on the remaining sub-planes B through D based on motion vectors selected in interprediction-encoding of the selected sub-plane A, and the motion vectors for the selected sub-plane A is received.

In operation 720, the image data for the interprediction-encoded sub-planes A through D and the motion vectors for the selected sub-plane A are extracted from the received bitstream.

In operation 730, interprediction-decoding is performed on the extracted image data for the sub-planes A through D using the extracted motion vectors for the selected sub-plane A.

In operation 740, the original image is reconstructed by performing inverse sub-sampling on the interprediction-decoded image data of the sub-planes A through D.

Hereinafter, an image encoder according to a second exemplary embodiment of the present invention will be described with reference to FIGS. 8 and 9. FIG. 8 is a block diagram of an image encoder according to a second exemplary embodiment of the present invention, and FIG. 9 is an illustration for explaining generation of a reference sub-plane according to the second exemplary embodiment of the present invention.

The image encoder according to the second exemplary embodiment of the present invention includes an image division unit 810, a reference sub-plane generation unit 820, a sub-plane encoding unit 830, and a bitstream generation unit 840.

Figure 9:
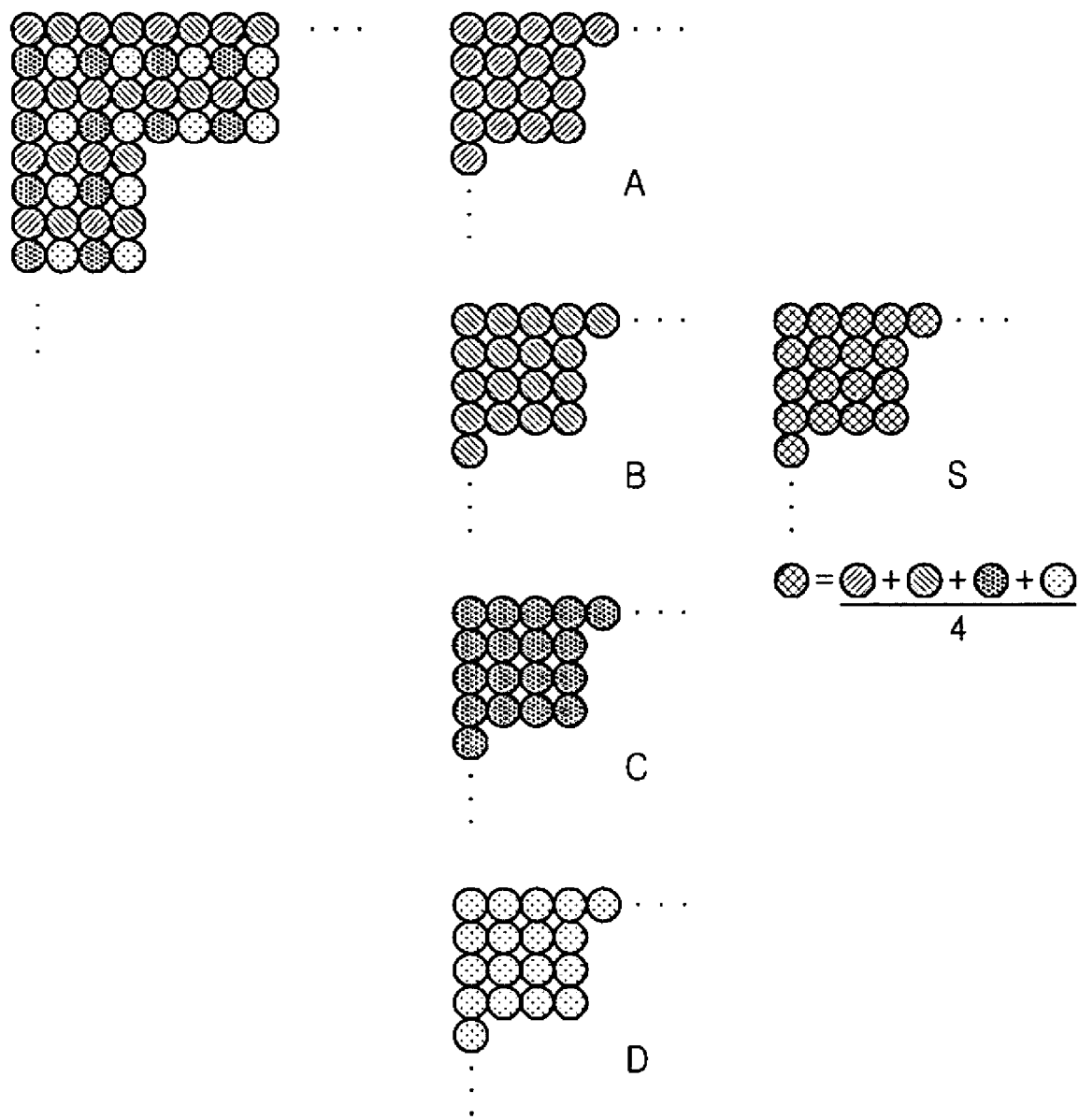
FIG. 9 is an illustration for explaining generation of a reference sub-plane according to a second exemplary embodiment of the present invention.

The image division unit 810 divides an input image into a plurality of sub-planes, e.g., four sub-planes A, B, C, and D as illustrated in FIG. 9, by sub-sampling the input image. For example, when an input image is in a common intermediate format (CIF) having a size of 352×288 pixels, it is divided into four 176×144 pixel sub-planes.

The reference sub-plane generation unit 820 generates a reference sub-plane based on the divided sub-planes. A reference sub-plane S is generated from the divided sub-planes A, B, C, and D as illustrated in FIG. 9. An average of pixels at the same positions in the divided sub-planes A, B, C, and D is obtained from Equation 1 and the obtained average is used as a pixel at the same position in the reference sub-plane S.

$$S=(A+B+C+D)/4 \qquad \text{Eq. (1)}$$

The reference sub-plane S may also be generated by a linear expression using the four sub-planes A, B, C, and D as follows:

$$S=a*A+b*B+c*C+d*D \qquad \text{Eq. (2)}$$

where, a, b, c, and d are real numbers.

The interprediction unit 832 of the sub-plane encoding unit 830 performs interprediction-encoding on the reference sub-plane S for a current image using a reference sub-plane for a reference image, which is generated in the same manner as the reference sub-plane S for the current image, and selects a motion vector for each macroblock or each predetermined block of the reference sub-plane S. The reference sub-plane S may be interprediction-encoded with reference to a predetermined sub-plane of the reference image.

The interprediction unit 832 performs interprediction-encoding on the divided sub-planes A through D using motion vectors selected in interprediction-encoding of the reference sub-plane S.

In other words, interprediction-encoding is performed on the sub-planes A through D using the same motion vectors, thereby reducing the number of bits representing motion vectors to be transmitted with interprediction-encoded image data. In the image encoder according to the second exemplary embodiment of the present invention, interprediction-encoding is performed using the reference sub-plane S obtained by averaging the divided sub-planes A through D, and motion vectors obtained in interprediction-encoding are shared among the sub-planes A through D, thereby improving interprediction-encoding efficiency by increasing similarity among the motion vectors obtained in interprediction-encoding of sub-planes A through D.

When the sub-plane encoding unit 830 further includes an entropy-encoding unit, the entropy-encoding unit performs entropy-encoding only on the motion vectors for the reference sub-plane S instead of on motion vectors for interprediction-encoded sub-planes A through D.

The bitstream generation unit 840 generates a bitstream including image data of the interprediction-encoded sub-planes A through D and the motion vectors selected in interprediction-encoding of the reference sub-plane S. The bitstream does not include the motion vectors for the interprediction-encoded sub-planes A through D because the sub-planes A through D share the same motion vectors with the reference sub-plane S. Since the motion vectors for the sub-planes A through D are not transmitted, the number of bits to be transmitted can be reduced.

Figure 10:
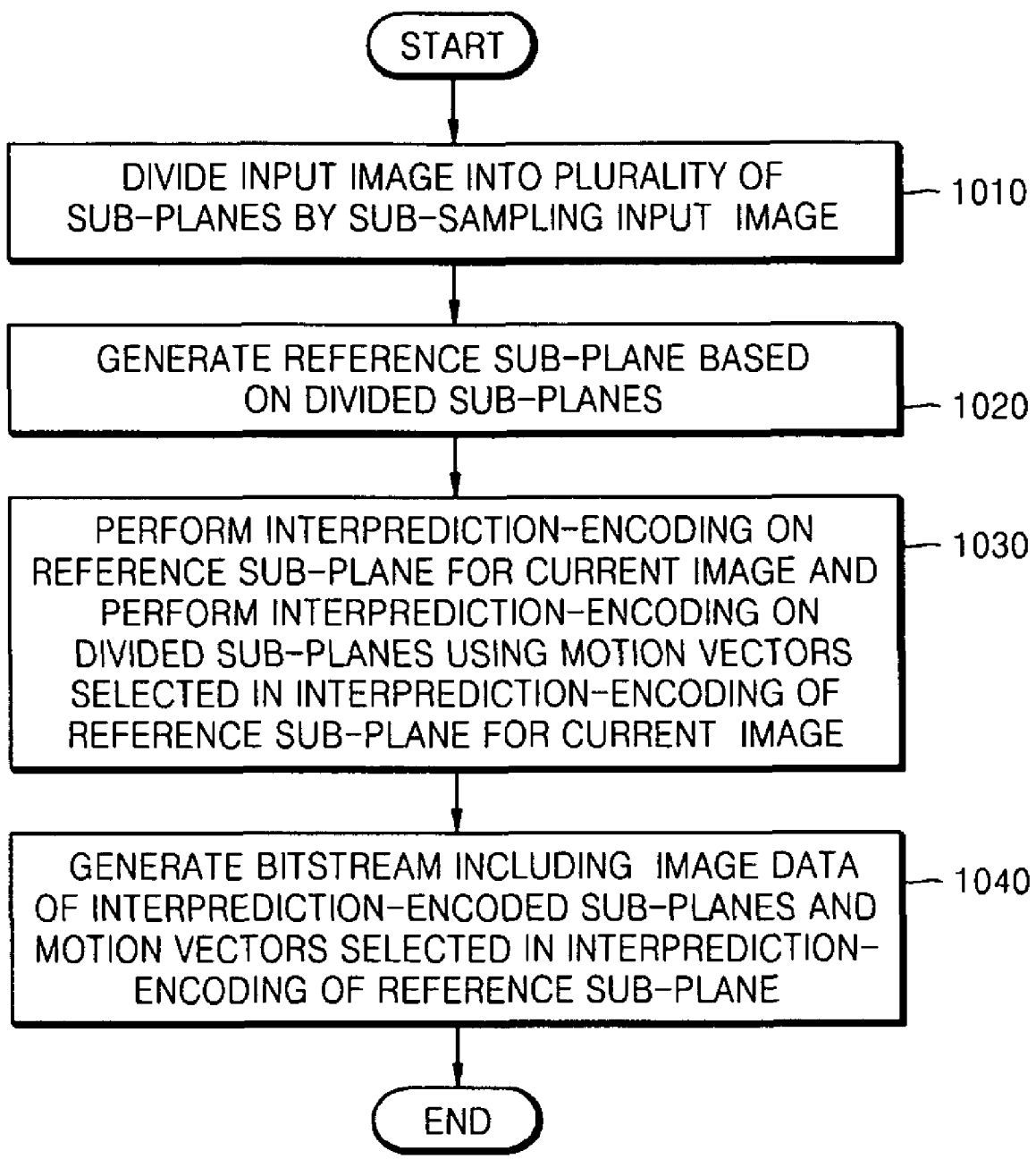
FIG. 10 is a flowchart illustrating an image encoding method implemented by the image encoder of FIG. 8.

FIG. 10 is a flowchart illustrating an image encoding method implemented by the image encoder of FIG. 8.

In operation 1010, an input image is divided into a plurality of sub-planes, e.g., four sub-planes A through D as illustrated in FIG. 9, through sub-sampling.

In operation 1020, a reference sub-plane is generated based on the divided sub-planes. In the current exemplary embodiment of the present invention, a reference sub-plane S is generated from the divided sub-planes A through D as illustrated in FIG. 9.

In operation 1030, interprediction-encoding is performed on the reference sub-plane S for a current image using a reference sub-plane for a reference image generated in the same manner as the reference sub-plane S for the current image and a motion vector is selected for each macroblock or each predetermined block of the reference sub-plane S. The interprediction unit performs interprediction-encoding on the divided sub-planes A through D using motion vectors selected in interprediction-encoding of the reference sub-plane S.

In operation 1040, a bitstream including image data of the interprediction-encoded sub-planes and motion vectors selected in interprediction-encoding of the reference sub-plane S is generated. The bitstream does not include motion vectors for the interprediction-encoded sub-planes A through D.

Hereinafter, an image decoder according to the second exemplary embodiment of the present invention will be described with reference to FIG. 6.

In the image decoder according to the second exemplary embodiment of the present invention, the image data extraction unit 610 receives an interprediction-encoded bitstream, extracts image data for interprediction-encoded sub-planes A through D and motion vectors for a reference sub-plane S from the received bitstream, and transmits the extracted image data and motion vectors to the sub-plane decoding unit 620. The bitstream includes image data obtained by generating the reference sub-plane S for the input image based on the sub-planes A through D obtained by sub-sampling the input image, performing interprediction-encoding on the reference sub-plane S for the current image by referring to a reference sub-plane for a reference image generated in the same manner as the reference sub-plane S, and performing interprediction-encoding on the sub-planes A through D based on the motion vectors selected in interprediction-encoding of the reference sub-plane S and includes the motion vectors selected in interprediction-encoding of the reference sub-plane S.

The interprediction unit of the sub-plane decoding unit 620 performs interprediction-decoding on the extracted image data for the sub-planes A through D using the extracted motion vectors for the reference sub-plane S.

The image reconstruction unit 630 reconstructs the original image by performing inverse sub-sampling based on the image data for the sub-planes A through D that is interprediction-decoded by the sub-plane decoding unit 620.

Figure 11:
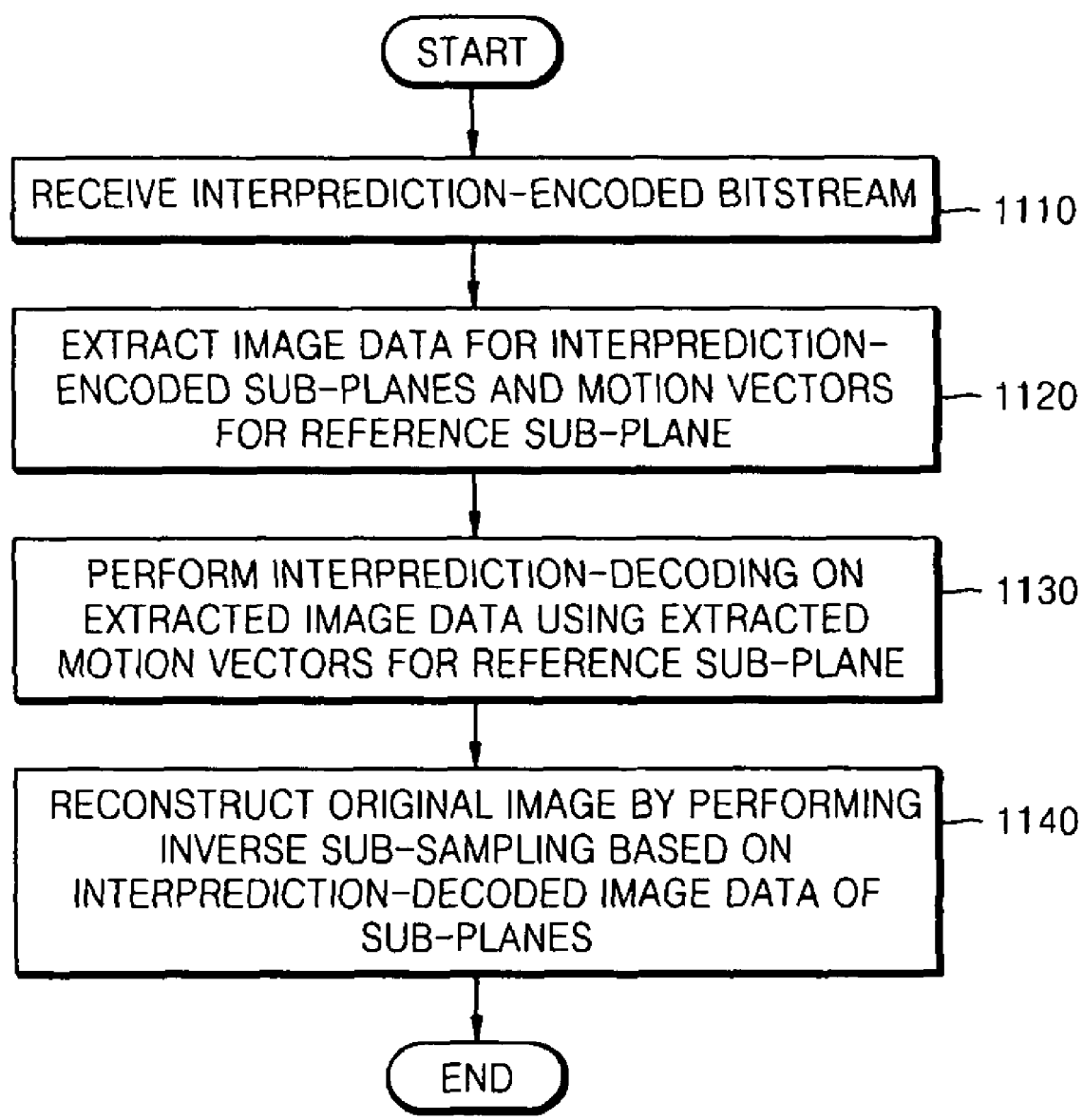
FIG. 11 is a flowchart illustrating an image decoding method according to a second exemplary embodiment of the present invention.

FIG. 11 is a flowchart illustrating an image decoding method according to the second exemplary embodiment of the present invention.

In operation 1110, a bitstream including image data obtained by generating the reference sub-plane S for the input image based on the sub-planes A through D obtained by sub-sampling the input image, performing interprediction-encoding on the reference sub-plane S for the current image by referring to a reference sub-plane for a reference image generated in the same manner as the reference sub-plane S, and performing interprediction-encoding on the sub-planes A through D based on motion vectors selected in interprediction-encoding of the reference sub-plane S and including the motion vectors selected in interprediction-encoding of the reference sub-plane S, is received.

In operation 1120, the image data for the sub-planes A through D and the motion vectors for the reference sub-plane S are extracted from the received bitstream.

In operation 1130, interprediction-decoding is performed on the extracted image data for the sub-planes A through D using the extracted motion vectors for the reference sub-plane S.

In operation 1140, the original image is reconstructed by performing inverse sub-sampling based on the interprediction-decoded image data of the sub-planes A through D.

Hereinafter, an image encoder according to a third exemplary embodiment of the present invention will be described with reference to FIGS. 2 and 12.

Figure 12:
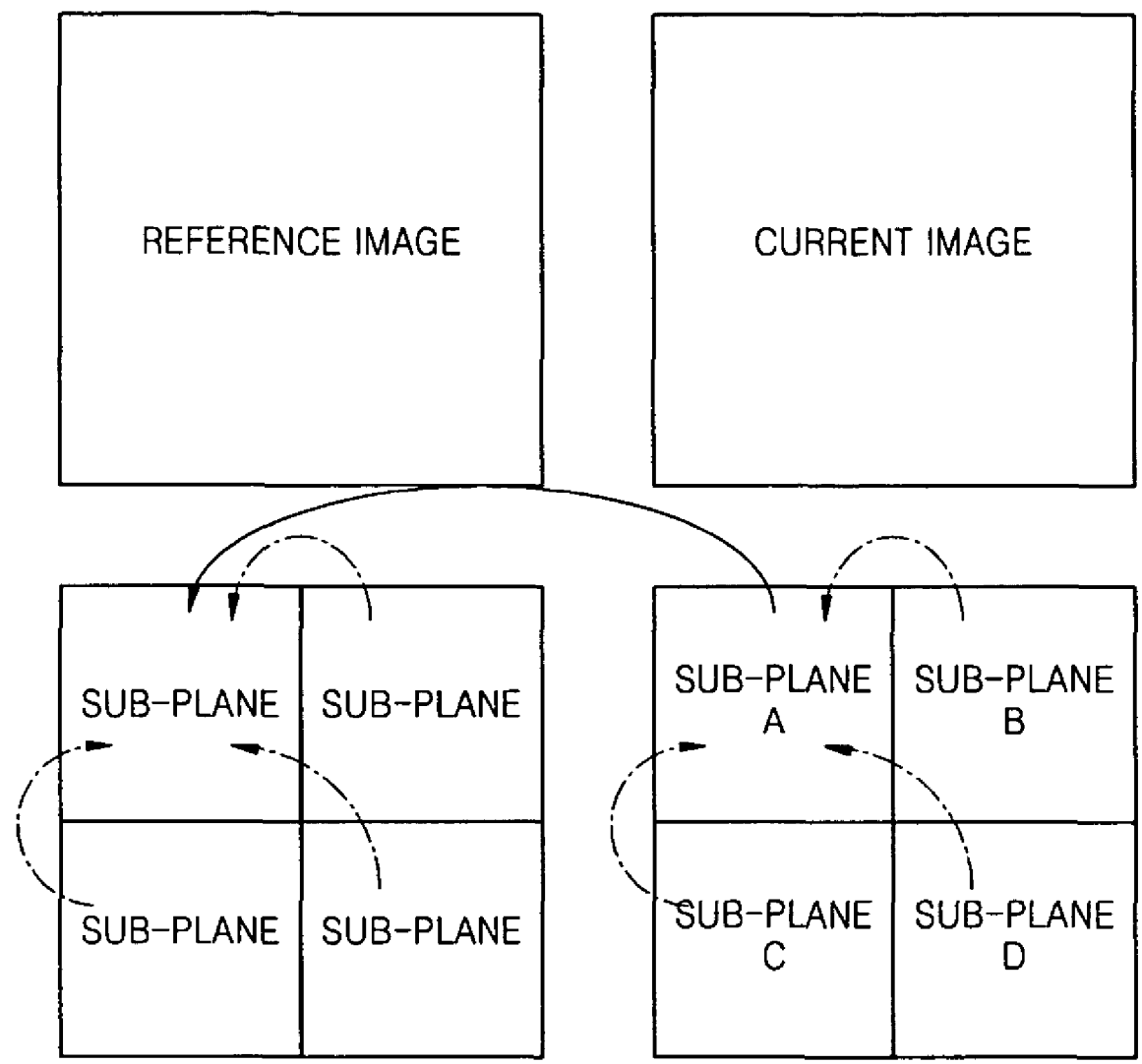
FIG. 12 is an illustration for explaining interprediction-encoding according to a third exemplary embodiment of the present invention.

FIG. 12 is an illustration for explaining interprediction according to the third exemplary embodiment of the present invention.

In the image decoder according to the third exemplary embodiment of the present invention, the image division unit 210 divides 210 divides an input image into a plurality of sub-planes, e.g., four sub-planes A through D as illustrated in FIG. 12.

The interprediction unit 222 of the sub-plane encoding unit 220 selects one of the divided sub-planes A through D, e.g., the sub-plane A as illustrated in FIG. 12, and performs interprediction-encoding on the selected sub-plane A using divided sub-planes of a previous input image as reference sub-planes. For example, when interprediction-encoding is performed for each macroblock, a motion vector is selected for each macroblock and interprediction-encoding is performed using selected motion vectors.

Interprediction-encoding of the selected sub-plane may be performed according to a conventional interprediction method and a detailed description thereof will not be provided.

The sub-plane encoding unit 220 reduces the number of bits of motion vectors using similarity between sub-planes obtained through sub-sampling. Thus, in the current exemplary embodiment of the present invention, interprediction-encoding is performed on the remaining sub-planes B through D using the selected sub-plane A as a reference sub-plane. In this case, since motion vectors approach 0 during prediction between sub-planes obtained by sub-sampling an image, the number of bits of the motion vectors is reduced. Encoding may be performed while motion vectors for interprediction-encoding of the sub-planes B through D are fixed to 0, thereby effectively reducing the number of bits to be transmitted. Since the sub-planes A through D are obtained by sub-sampling the input image, an increase in the number of bits of an error block is not large even when the motion vectors are fixed to 0.

The bitstream generation unit 230 generates a bitstream including image data of the interprediction-encoded sub-planes A through D and motion vectors selected in interprediction-encoding of the sub-planes A through D. When the motion vectors for interprediction-encoding of the sub-planes B through D are fixed to 0, the bitstream may include the image data of the interprediction-encoded sub-planes A through D and the motion vectors for the selected sub-plane A, thereby effectively reducing the number of bits to be transmitted.

Figure 13:
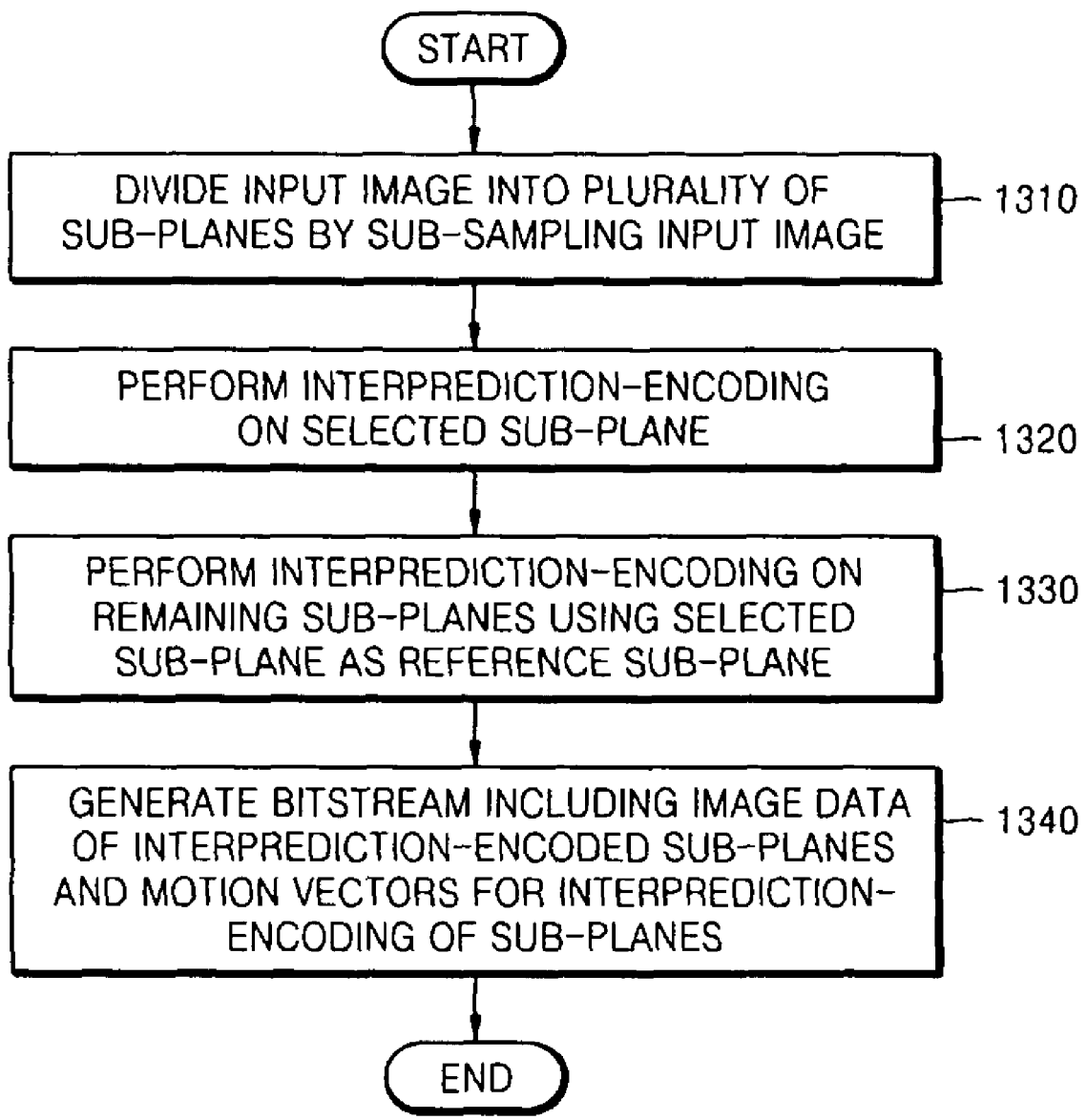
FIG. 13 is a flowchart illustrating an image encoding method according to a third exemplary embodiment of the present invention.

FIG. 13 is a flowchart illustrating an image encoding method according to the third exemplary embodiment of the present invention.

In operation 1310, an input image is divided into a plurality of sub-planes, e.g., four sub-planes A through D as illustrated in FIG. 12, through sub-sampling.

In operation 1320, one of the divided sub-planes, e.g., the sub-plane A, is selected and interprediction-encoding is performed on the selected sub-plane A using divided sub-planes of a previous input image as reference sub-planes.

In operation 1330, interprediction-encoding is performed on the remaining sub-planes B through D using the sub-plane A as a reference sub-plane.

In operation 1340, a bitstream including image data of the interprediction-encoded sub-planes A through D and motion vectors selected in interprediction-encoding of the sub-planes A through D is generated. When the motion vectors for interprediction-encoding of the sub-planes B through D are fixed to 0, the bitstream may include the image data of the interprediction-encoded sub-planes A through D and motion vectors for the selected sub-plane A, thereby effectively reducing the number of bits to be transmitted.

Hereinafter, an image decoder according to the third exemplary embodiment of the present invention will be described with reference to FIG. 6.

In the image decoder according to the third exemplary embodiment of the present invention, the image data extraction unit 610 receives an encoded bitstream, extracts image data for the interprediction-encoded sub-planes A through D and motion vectors for the sub-planes A through D from the received bitstream, and transmits the extracted image data and motion vectors to the sub-plane decoding unit 620. The encoded bitstream includes image data obtained by selecting one of a plurality of sub-planes obtained by sub-sampling the input image, e.g., the sub-plane A, and performing interprediction-encoding on the selected sub-plane A, image data obtained by performing interprediction-encoding on the remaining sub-planes B through D using the selected sub-plane A as a reference sub-plane, and includes the motion vectors for the sub-planes A through D. When motion vectors are fixed, e.g., to 0, during interprediction-encoding of the remaining sub-planes B through D, the bitstream may include the image data of the interprediction-encoded sub-planes A through D and the motion vectors for the selected sub-plane A. When the image data included in the bitstream is transformed and quantized, inverse transformation and inverse quantization corresponding to transformation and quantization of an image encoder are performed on the extracted image data and the resulting data is transmitted to the sub-plane decoding unit 620.

The sub-plane decoding unit 620 performs interprediction-decoding on the extracted image data for the selected sub-plane A among the extracted image data for the sub-planes A through D using the extracted motion vectors. The sub-plane decoding unit 620 performs interprediction-decoding on the remaining sub-planes B through D using the interprediction-decoded sub-plane A as a reference sub-plane.

The image reconstruction unit 630 reconstructs the original image by performing inverse sub-sampling based on the image data for the sub-planes A through D that is interprediction-decoded by the sub-plane decoding unit 620.

Figure 14:
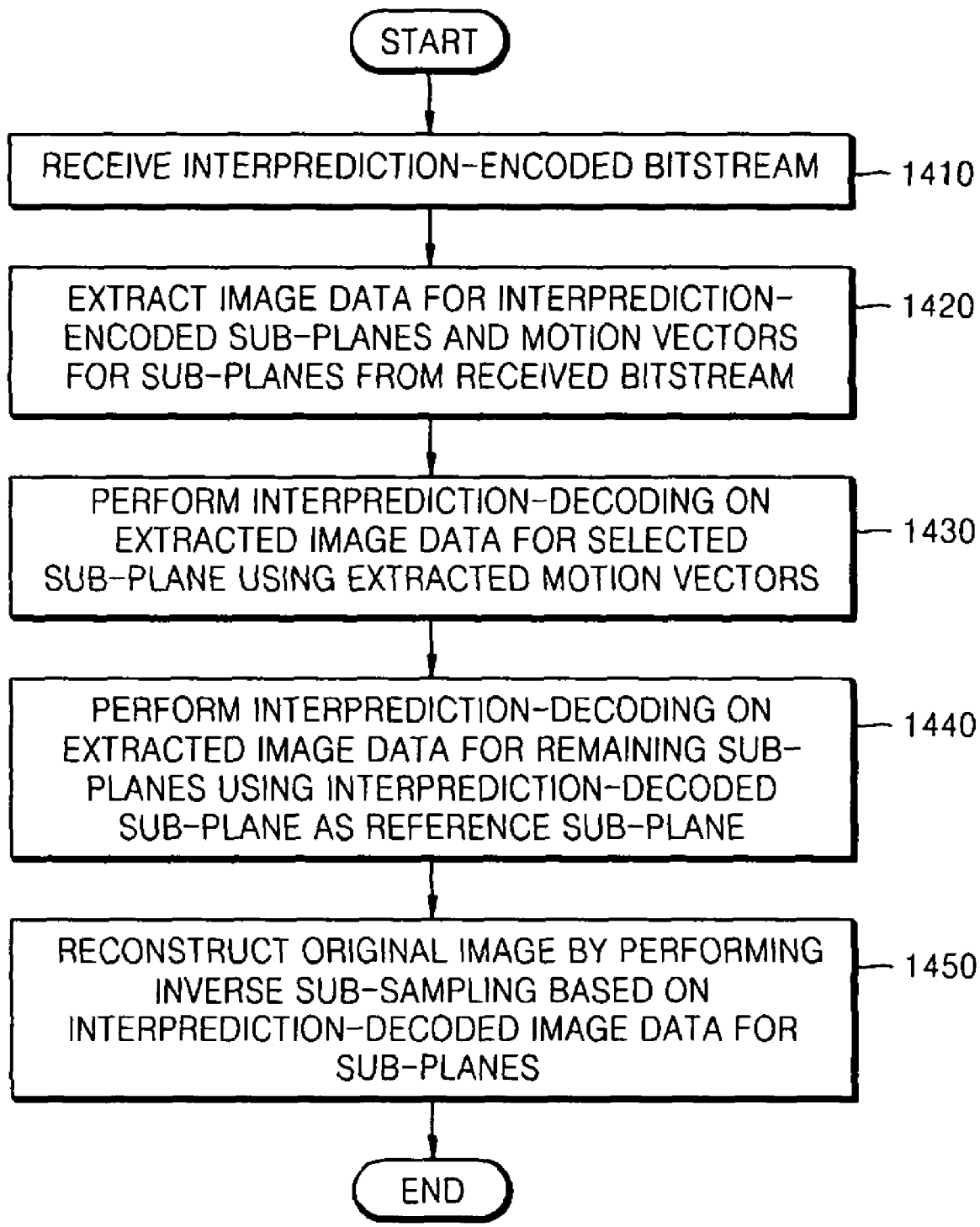
FIG. 14 is a flowchart illustrating an image decoding method according to a third exemplary embodiment of the present invention.

FIG. 14 is a flowchart illustrating an image decoding method according to the third exemplary embodiment of the present invention.

In operation 1410, an encoded bitstream including image data obtained by selecting one of a plurality of sub-planes A through D obtained by sub-sampling an input image, e.g., the sub-plane A, and performing interprediction-encoding on the selected sub-plane A, image data obtained by performing interprediction-encoding on the remaining sub-planes B through D using the selected sub-plane A as a reference sub-plane, and motion vectors for the sub-planes A through D, is received.

In operation 1420, image data for the interprediction-encoded sub-planes A through D and motion vectors for the sub-planes A through D are extracted from the received bitstream.

In operation 1430, interprediction-decoding is performed on the extracted image data for the selected sub-plane A among the extracted image data for the sub-planes A through D using the extracted motion vectors.

In operation 1440, interprediction-decoding is performed on the extracted image data for the remaining sub-planes B through D using the interprediction-decoded sub-plane A as a reference sub-plane.

In operation 1450, the original image is reconstructed by performing inverse sub-sampling based on the interprediction-decoded image data for the sub-planes A through D.

Figure 15:
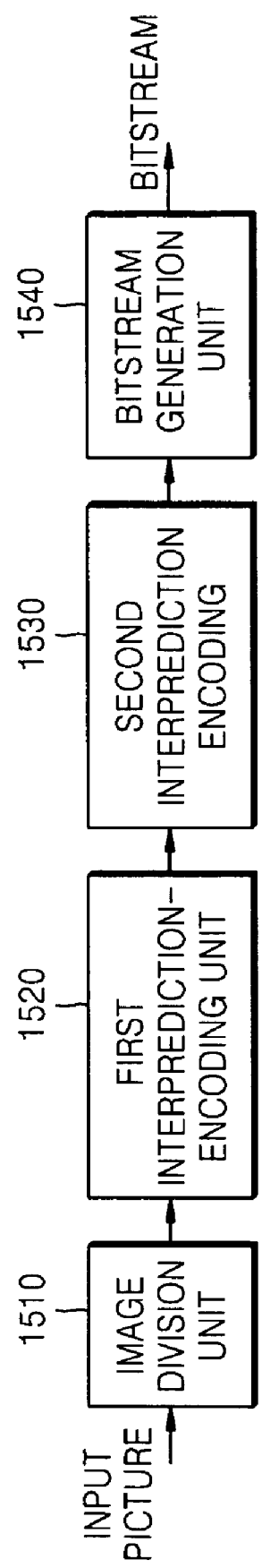
FIG. 15 is a block diagram of an image encoder according to a fourth exemplary embodiment of the present invention.

Hereinafter, an image encoder according to a fourth exemplary embodiment of the present invention will be described with reference to FIGS. 15 and 16. FIG. 15 is a block diagram of an image encoder according to the fourth exemplary embodiment of the present invention, and FIG. 16 is a view for explaining interprediction-encoding according to the fourth embodiment of the present invention.

The image encoder according to the fourth exemplary embodiment of the present invention includes an image division unit 1510, a first interprediction-encoding unit 1520, a second interprediction-encoding unit 1530, and a bitstream generation unit 1540.

Figure 16:
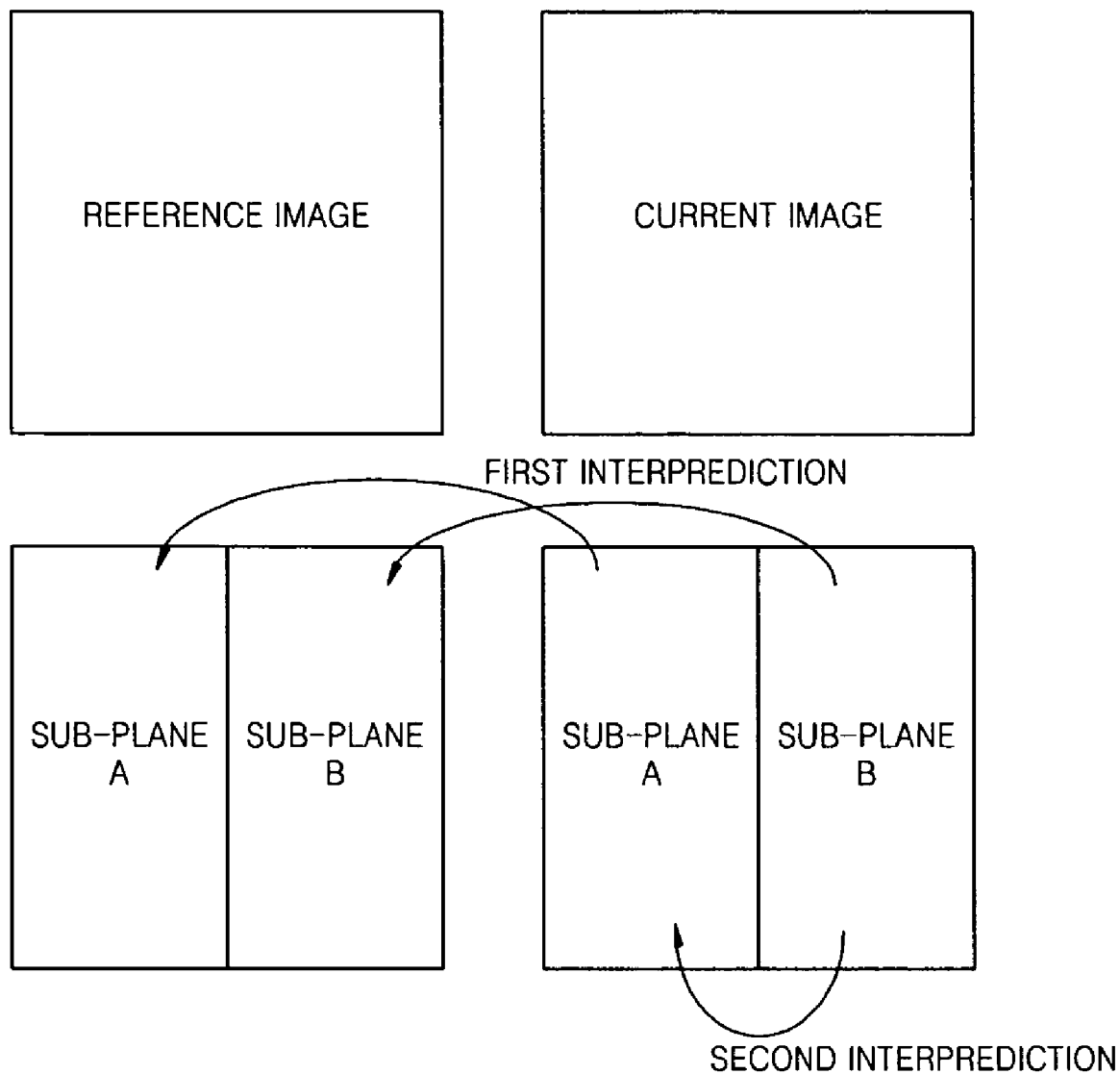
FIG. 16 is an illustration for explaining interprediction-encoding according to a fourth exemplary embodiment of the present invention.

The image division unit 1510 divides an input image into a plurality of sub-planes, e.g., two sub-planes A and B as illustrated in FIG. 16, by sub-sampling the input image When an input image is in a common intermediate format (CIF) having a size of 352×288 pixels, it is divided into two 176×288 pixel sub-planes.

The first interprediction-encoding unit 1520 performs first interprediction-encoding on the divided sub-planes A and B. In the current exemplary embodiment of the present invention, interprediction-encoding of the sub-planes A and B may be performed according to conventional interprediction-encoding or interprediction-encoding disclosed in preceding exemplary embodiments of the present invention. The first interprediction-encoding further includes motion estimation and motion compensation. In addition, the first interprediction-encoding may further include transformation, quantization, and entropy-encoding.

The second interprediction-encoding unit 1530 performs second interprediction-encoding on the interprediction-encoded sub-plane B using one of the sub-planes undergoing the first interprediction-encoding, e.g., the sub-plane A, as a reference sub-plane. The second interprediction-encoding according to the current exemplary embodiment of the present invention is implemented by obtaining a residue between the sub-planes A and B that undergo the first interprediction-encoding. However, the second interprediction-encoding may also be implemented by general interprediction between the sub-planes A and B that undergo the first interprediction-encoding. The second interprediction-encoding includes transformation, quantization, and entropy-encoding.

The bitstream generation unit 1540 generates a bitstream including image data of the sub-plane A undergoing the first interprediction-encoding, image data of the sub-plane B undergoing the second interprediction-encoding, and motion vectors for interprediction-encoding of the sub-planes A and B.

In the current exemplary embodiment of the present invention, the number of coefficients of an error block, i.e., residue coefficients, is reduced using similarity between sub-planes. When the input image is an inter-image, it is divided into a plurality of sub-planes through sub-sampling, interprediction-encoding is performed on each of the sub-planes according to conventional interprediction using a reference sub-plane that is temporally different from the sub-plane to be interprediction-encoded, and residual data between different sub-planes of the input image is predicted, thereby reducing the number of bits of a residue.

This results from the similarity between sub-sampled images, and similarity between movement when a reference sub-plane that is temporally the same as a sub-plane to be interprediction-encoded is used, thus resulting in similarity between residues. The image encoder according to the current exemplary embodiment of the present invention can improve compression efficiency using similarity between residues between sub-planes.

Figure 17:
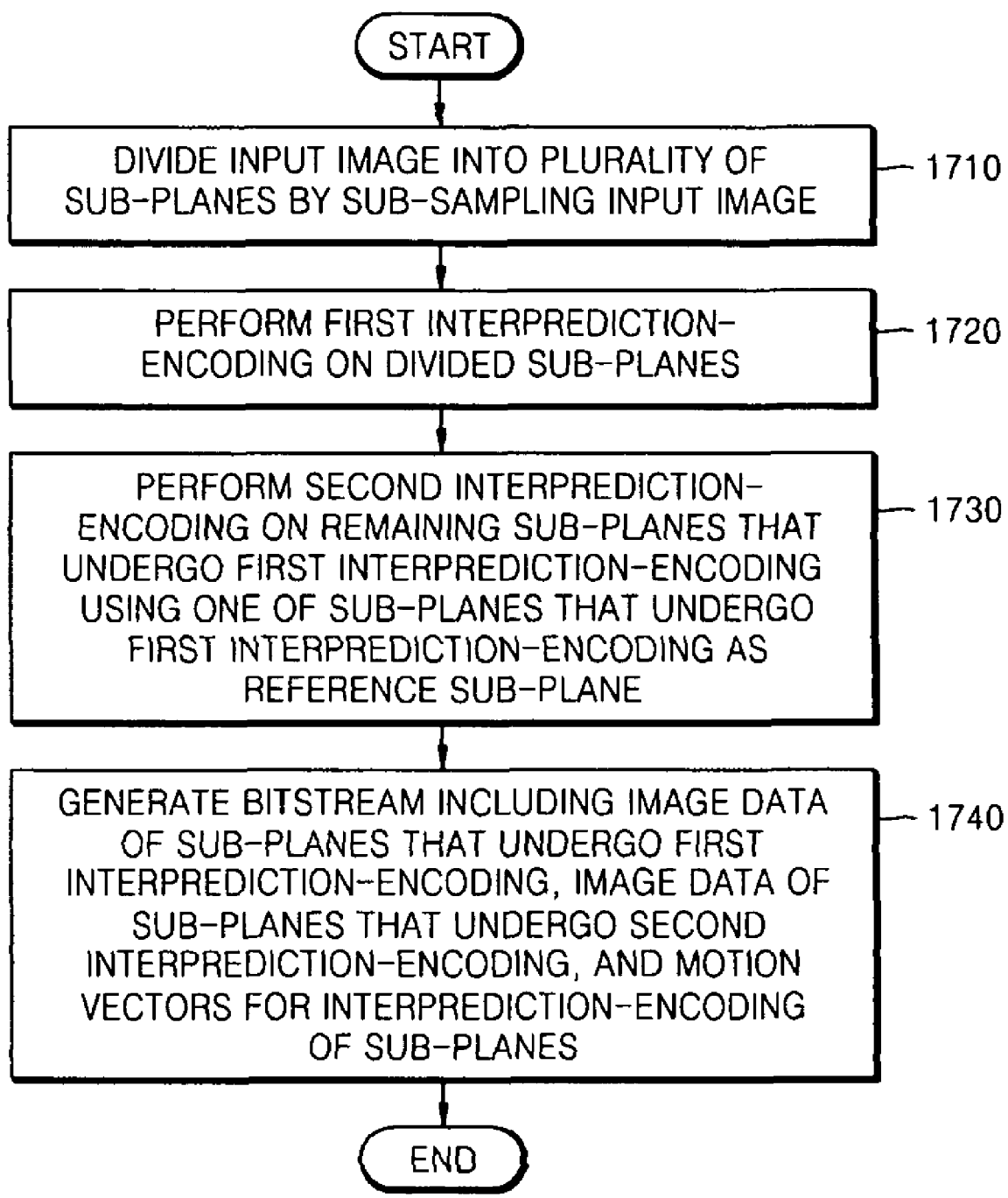
FIG. 17 is a flowchart illustrating an image encoding method implemented by the image encoder of FIG. 15.

FIG. 17 is a flowchart illustrating an image encoding method implemented by the image encoder of FIG. 15.

In operation 1710, an input image is divided into a plurality of sub-planes, e.g., two sub-planes A and B as illustrated in FIG. 16, through sub-sampling.

In operation 1720, first interprediction-encoding is performed on the divided sub-planes A and B. In the current exemplary embodiment of the present invention, interprediction-encoding of the sub-planes A and B may be performed according to conventional interprediction-encoding or interprediction-encoding disclosed in preceding exemplary embodiments of the present invention. The first interprediction-encoding further includes motion estimation and motion compensation. The first interprediction-encoding may also include transformation, quantization, and entropy-encoding.

In operation 1730, second interprediction-encoding is performed on one of the sub-planes A and B that undergo the first interprediction-encoding, e.g., the sub-plane B, using the other sub-plane A as a reference sub-plane. The second interprediction-encoding is implemented by obtaining a difference between residual coefficients of the sub-planes A and B that undergo the first interprediction-encoding. The second interprediction-encoding may further include transformation, quantization, and entropy-encoding.

In operation 1740, a bitstream including image data of the sub-plane A that undergoes the first interprediction-encoding, image data of the sub-plane B that undergoes the second interprediction-encoding, and motion vectors for interprediction-encoding of the sub-planes A and B is generated.

Figure 18:
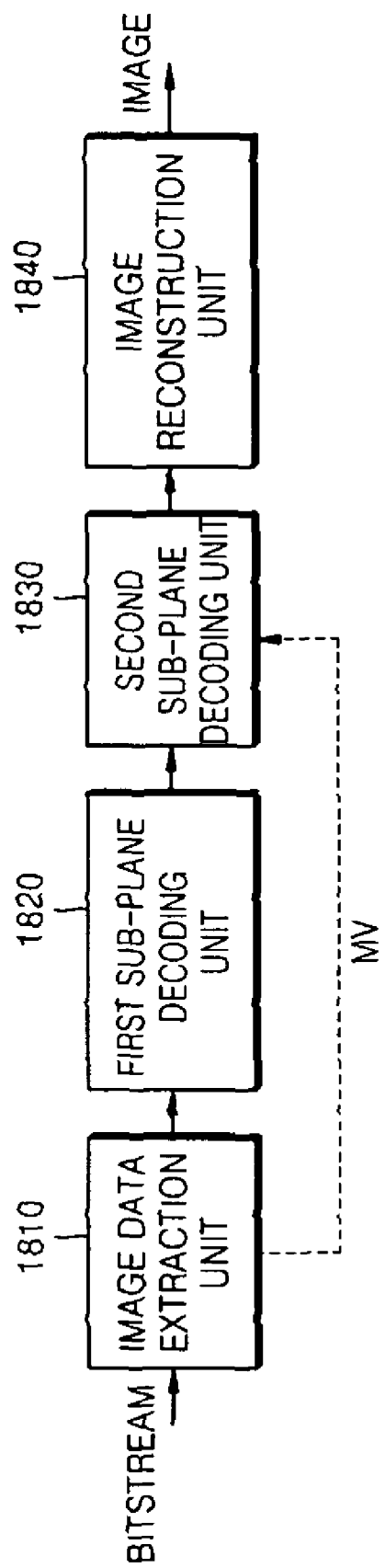
FIG. 18 is a block diagram of an image decoder according to a fourth exemplary embodiment of the present invention.

FIG. 18 is a block diagram of an image decoder according to the fourth exemplary embodiment of the present invention. Referring to FIG. 18, the image decoder includes an image data extraction unit 1810, a first sub-plane decoding unit 1820, a second sub-plane decoding unit 1830, and an image reconstruction unit 1840.

The image data extraction unit 1810 receives an encoded bitstream including image data obtained by performing first interprediction-encoding on sub-planes A and B obtained by sub-sampling an input image, selecting one of the sub-planes that undergo the first interprediction-encoding, e.g., the sub-plane A, and performing second interprediction-encoding on the sub-plane B using the selected sub-plane A undergoing the first interprediction-encoding as a reference sub-plane, image data for the sub-plane A undergoing the first interprediction-encoding, and motion vectors for interprediction-encoding of the sub-planes A and B. The image data extraction unit 1810 extracts the image data for the sub-planes A and B and the motion vectors from the received bitstream and transmits the extracted image data to the first sub-plane decoding unit 1820. The motion vectors may be transmitted to the second sub-plane decoding unit 1830.

The first sub-plane decoding unit 1820 performs first interprediction-decoding corresponding to the second interprediction-encoding on the extracted image data for the sub-plane B using the extracted image data for the selected sub-plane A as a reference image. In the current exemplary embodiment of the present invention, the first interprediction-decoding is implemented by adding residual data of the sub-plane A to the extracted image data of the sub-plane B.

The second sub-plane decoding unit 1830 performs second interprediction-decoding corresponding to the first interprediction-encoding based on the image data for the sub-plane B undergoing the first interprediction-decoding, the extracted image data for the first sub-plane A, and the extracted motion vectors.

The image reconstruction unit 1840 reconstructs the original image by performing inverse sub-sampling on the image data of the sub-planes A and B that is interprediction-decoded by the second sub-plane decoding unit 1830.

Figure 19:
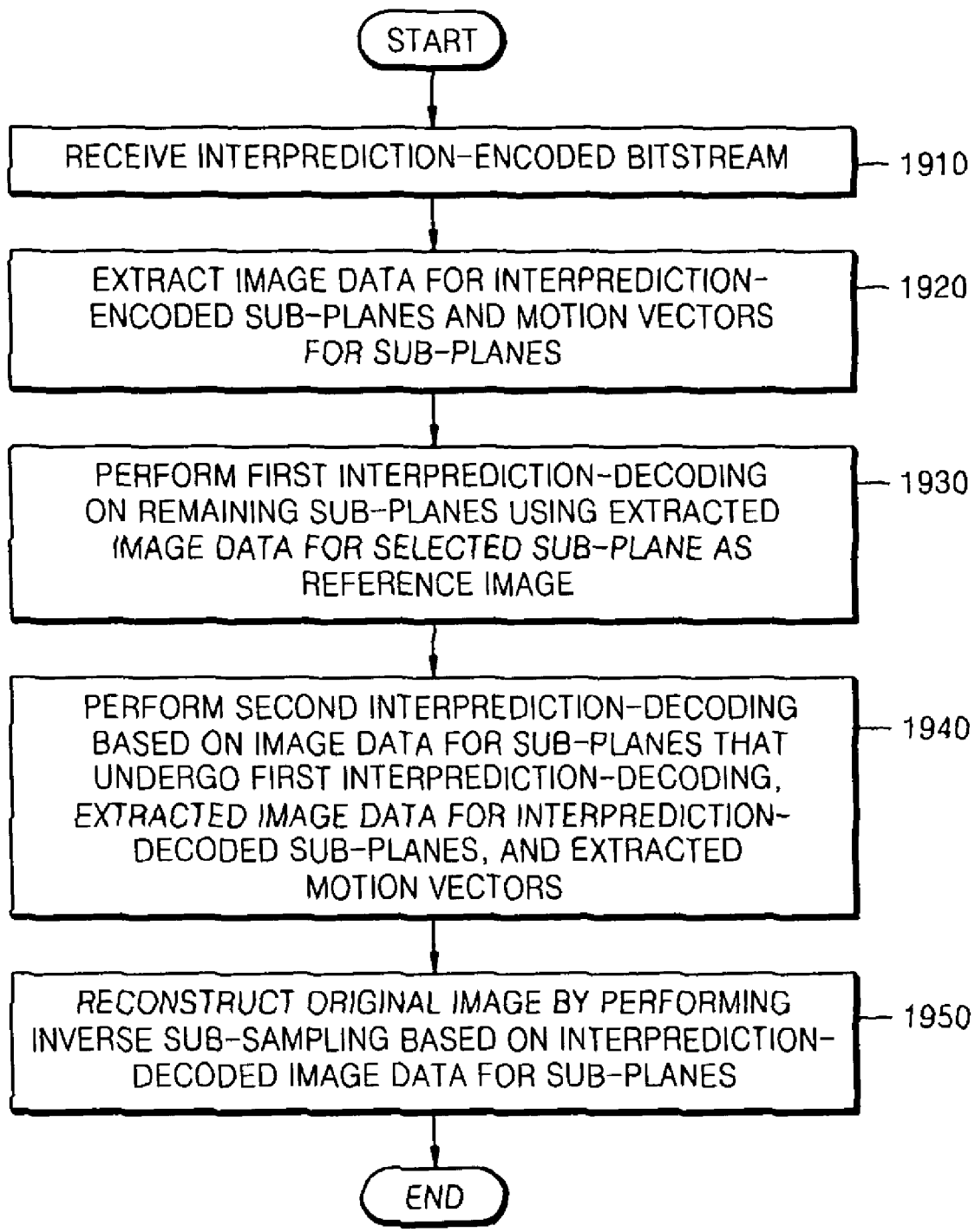
FIG. 19 is a flowchart illustrating an image decoding method implemented by the image decoder of FIG. 18.

FIG. 19 is a flowchart illustrating an image decoding method implemented by the image decoder of FIG. 18.

In operation 1910, an encoded bitstream including image data obtained by performing first interprediction-encoding on sub-planes obtained by sub-sampling an input image, selecting one of the sub-planes that undergo the first interprediction-encoding, e.g., the sub-plane A, and performing second interprediction-encoding on the sub-plane B using the selected sub-plane A undergoing the first interprediction-encoding as a reference sub-plane, image data for the sub-plane A undergoing the first interprediction-encoding, and motion vectors for interprediction-encoding of the sub-planes A and B is received.

In operation 1920, the image data for the interprediction-encoded sub-planes A and B and the motion vectors for the sub-planes A and B are extracted from the received bitstream.

In operation 1930, first interprediction-decoding corresponding to the second interprediction-encoding is performed on the extracted image data for the sub-plane B using the extracted image data for the selected sub-plane A as a reference image. In the current exemplary embodiment of the present invention, the first interprediction-decoding is implemented by adding residual data of the sub-plane A to the extracted image data for the sub-plane B.

In operation 1940, second interprediction-decoding corresponding to the first interprediction-encoding is performed based on the image data for the sub-plane B undergoing the first interprediction-decoding, the extracted image data for the first sub-plane A, and the extracted motion vectors.

In operation 1950, the original image is reconstructed by performing inverse sub-sampling on the image data for the sub-planes A and B that is interprediction-decoded in operation 1940.

As described above, according to the exemplary embodiment of the present invention, an input image is divided into a plurality of sub-planes through sub-sampling, interprediction-encoding is performed on one of the divided sub-planes, and interprediction-encoding is performed on the remaining sub-planes based on motion vectors selected in interprediction-encoding, thereby reducing the number of bits of motion vectors using similarity between the sub-planes.

In addition, an input image is divided into a plurality of sub-planes through sub-sampling, a reference sub-plane is generated for a current image based on the divided sub-planes, and interprediction-encoding is performed on the remaining sub-planes based on motion vectors selected in interprediction-encoding of the generated reference sub-plane, thereby reducing the number of bits of motion vectors using similarity between the sub-planes.

Moreover, an input image is divided into a plurality of sub-planes through sub-sampling, one of the divided sub-planes is selected, interprediction-encoding is performed on the selected sub-plane, and interprediction-encoding is performed on the remaining sub-planes using the selected sub-plane as a reference sub-plane, thereby reducing the number of bits of motion vectors using similarity between the sub-planes.

Furthermore, an input image is divided into a plurality of sub-planes through sub-sampling, first interprediction-encoding is performed on the divided sub-planes, and one of the sub-planes undergoing the first interprediction-encoding is used as a reference sub-plane to perform second interprediction-encoding on the remaining sub-planes, thereby reducing the number of bits of motion vectors using similarity between the sub-planes.

Meanwhile, the present invention can also be embodied as a computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (e.g., transmission over the Internet). The computer-readable recording medium can also be distributed over network coupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. An image encoding method comprising:
   dividing an input image into a plurality of sub-planes by sub-sampling the input image;
   performing interprediction-encoding on a selected divided sub-plane; and
   performing interprediction-encoding on remaining divided sub-planes based on motion vectors obtained from the interprediction-encoding of the selected sub-plane,
   wherein the input image is sub-sampled in an interleaved manner resulting in the divided plurality of sub-planes having a same resolution, and
   wherein each pixel in the input image only appears in one of the divided sub-planes.

2. The image encoding method of claim 1, further comprising performing entropy-encoding on image data of the interprediction-encoded sub-planes and motion vectors for the selected sub-plane.

3. The image encoding method of claim 1, further comprising generating a bitstream including image data of the interprediction-encoded sub-planes and motion vectors for the selected sub-plane.

4. An image encoder comprising:
an image division device which divides an input image into a plurality of sub-planes by sub-sampling the input image; and
a sub-plane encoding unit which selects one of the divided sub-planes, performs interprediction-encoding on the selected sub-plane, and performs interprediction-encoding on the remaining sub-planes based on motion vectors obtained in interprediction-encoding of the selected sub-plane,
wherein the input image is sub-sampled in an interleaved manner resulting in the divided plurality of sub-planes having a same resolution, and
wherein each pixel in the input image only appears in one of the divided sub-planes.

5. The image encoder of claim 4, further comprising an entropy-encoding unit which performs entropy-encoding on image data of the interprediction-encoded sub-planes and motion vectors for the selected sub-plane.

6. The image encoder of claim 4, further comprising a bitstream generation unit which generates a bitstream including image data of the interprediction-encoded sub-planes and motion vectors for the selected sub-plane.

7. An image encoding method comprising:
dividing an input image into a plurality of sub-planes by sub-sampling the input image;
generating a reference sub-plane for a current image based on the divided sub-planes;
performing interprediction-encoding on the generated reference sub-plane for the current image; and
performing interprediction-encoding on the divided sub-planes based on motion vectors obtained in the interprediction-encoding of the generated reference sub-plane,
wherein the input image is sub-sampled in an interleaved manner resulting in the divided plurality of sub-planes having a same resolution, and
wherein each pixel in the input image only appears in one of the divided sub-planes.

8. The image encoding method of claim 7, wherein the reference sub-plane is generated by obtaining an average of pixel values of at least two of the divided sub-planes and using the obtained average as a pixel at a corresponding position in the reference sub-plane.

9. The image encoding method of claim 7, wherein the interprediction-encoding of the generated reference sub-plane for the current image is performed by referring to a reference sub-plane for a reference image generated in the same manner as the generated reference sub-plane for the current image.

10. The image encoding method of claim 7, further comprising performing entropy-encoding on image data of the interprediction-encoded sub-planes and the motion vectors obtained from interprediction-encoding of the reference sub-plane.

11. The image encoding method of claim 7, further comprising generating a bitstream including image data of the interprediction-encoded sub-planes and the motion vectors obtained from interprediction-encoding of the reference sub-plane.

12. An image encoder comprising:
an image division device which divides an input image into a plurality of sub-planes by sub-sampling the input image;
a reference sub-plane generation device which generates a reference sub-plane for a current image based on the divided sub-planes; and
a sub-plane encoding unit which performs interprediction-encoding on the generated reference sub-plane for the current image and performs interprediction-encoding on the divided sub-planes based on motion vectors obtained from the interprediction-encoding of the generated reference sub-plane,
wherein the input image is sub-sampled in an interleaved manner resulting in the divided plurality of sub-planes having a same resolution, and
wherein each pixel in the input image only appears in one of the divided sub-planes.

13. The image encoder of claim 12, wherein the reference sub-plane is generated by obtaining an average of pixel values of at least two of the divided sub-planes and using the obtained average as a pixel at a corresponding position in the generated reference sub-plane.

14. The image encoder of claim 12, wherein the sub-plane encoding unit refers to a reference sub-plane for a reference image generated in the same manner as the generated reference sub-plane for the current image to perform interprediction-encoding on the generated reference sub-plane for the current image.

15. The image encoder of claim 12, further comprising an entropy-encoding unit which performs entropy-encoding on image data of the interprediction-encoded sub-planes and the motion vectors obtained from interprediction-encoding of the generated reference sub-plane.

16. The image encoder of claim 12, further comprising a bitstream generation unit which generates a bitstream including image data of the interprediction-encoded sub-planes and the motion vectors selected in interprediction-encoding of the generated reference sub-plane.

17. An image encoding method comprising:
dividing an input image into a plurality of sub-planes by sub-sampling the input image;
performing interprediction-encoding on a selected divided sub-plane; and
performing interprediction-encoding on the remaining divided sub-planes using the selected divided sub-plane as a reference sub-plane,
wherein the input image is sub-sampled in an interleaved manner resulting in the divided plurality of sub-planes having a same resolution, and
wherein each pixel in the input image only appears in one of the divided sub-planes.

18. The image encoding method of claim 17, further comprising performing entropy-encoding on image data of the interprediction-encoded sub-planes and motion vectors for the selected sub-plane.

19. The image encoding method of claim 17, further comprising generating a bitstream including image data of the interprediction-encoded sub-planes and motion vectors for the selected sub-plane.

20. An image encoder comprising:
an image division device which divides an input image into a plurality of sub-planes by sub-sampling the input image; and
a sub-plane encoding unit which selects one of the divided sub-planes, performs interprediction-encoding on the selected divided sub-plane, and performs interprediction-encoding on the remaining divided sub-planes using the selected divided sub-plane as a reference sub-plane, wherein the input image is sub-sampled in an interleaved manner resulting in the divided plurality of sub-planes having a same resolution, and wherein each pixel in the input image only appears in one of the divided sub-planes.

21. The image encoder of claim 20, further comprising an entropy-encoding device which performs entropy-encoding on image data of the interprediction-encoded sub-planes and motion vectors for the selected sub-plane.

22. The image encoder of claim 20, further comprising a bitstream generation device which generates a bitstream including image data of the interprediction-encoded sub-planes and motion vectors for the selected sub-plane.

23. An image encoding method comprising:
dividing an input image into a plurality of sub-planes by sub-sampling the input image;
performing first interprediction-encoding on the divided sub-planes;
selecting one of the sub-planes that undergo the first interprediction-encoding; and
performing second interprediction-encoding on remaining sub-planes that undergo the first interprediction-encoding using the selected sub-plane that undergoes the first interprediction-encoding as a reference sub-plane,
wherein the input image is sub-sampled in an interleaved manner resulting in the divided plurality of sub-planes having a same resolution, and
wherein each pixel in the input image only appears in one of the divided sub-planes.

24. The image encoding method of claim 23, wherein the second interprediction-encoding comprises obtaining a residue between the selected sub-plane that undergoes the first interprediction-encoding and the remaining sub-planes that undergo the first interprediction-encoding.

25. The image encoding method of claim 23, further comprising performing entropy-encoding on image data of the selected sub-plane that undergoes the first interprediction-encoding, image data of the remaining sub-planes that undergo the second interprediction-encoding, and motion vectors for interprediction-encoding of the divided sub-planes.

26. The image encoding method of claim 23, further comprising generating a bitstream including image data of the selected sub-plane that undergoes the first interprediction-encoding, image data of the remaining sub-planes that undergo the second interprediction-encoding, and motion vectors for interprediction-encoding of the divided sub-planes.

27. An image encoder comprising:
an image division device which divides an input image into a plurality of sub-planes by sub-sampling the input image;
a first interprediction-encoding unit which performs first interprediction-encoding on the divided sub-planes; and
a second interprediction-encoding unit which selects one of the sub-planes that undergo the first interprediction-encoding and performs second interprediction-encoding on the remaining sub-planes that undergo the first interprediction-encoding using the selected sub-plane that undergoes the first interprediction-encoding as a reference sub-plane,
wherein the input image is sub-sampled in an interleaved manner resulting in the divided plurality of sub-planes are having a same resolution, and
wherein each pixel in the input image only appears in one of the divided sub-planes.

28. The image encoder of claim 27, wherein the second interprediction-encoding comprises obtaining a residue between the selected sub-plane that undergoes the first interprediction-encoding and the remaining sub-planes that undergo the first interprediction-encoding.

29. The image encoder of claim 27, further comprising an entropy-encoding device which performs entropy-encoding on image data of the selected sub-plane that undergoes the first interprediction-encoding, image data of the remaining sub-planes that undergo the second interprediction-encoding, and motion vectors for interprediction-encoding of the divided sub-planes.

30. The image encoder of claim 27, further comprising a bitstream generation device which generates a bitstream including image data of the selected sub-plane that undergoes the first interprediction-encoding, image data of the remaining sub-planes that undergo the second interprediction-encoding, and motion vectors for interprediction-encoding of the divided sub-planes.

31. An image decoding method comprising:
receiving an encoded bitstream including image data obtained by selecting one of sub-planes of an input image obtained by sub-sampling an input image and performing interprediction-encoding on the selected sub-plane, image data obtained by performing interprediction-encoding on remaining sub-planes based on motion vectors selected in interprediction-encoding of the selected sub-plane, and motion vectors for the selected sub-plane;
extracting the image data for the interprediction-encoded sub-planes and the motion vectors for the selected sub-plane from the received bitstream; and
performing interprediction-decoding on the extracted image data for the interprediction-encoded sub-planes using the extracted motion vectors for the selected sub-plane,
wherein the input image is sub-sampled in an interleaved manner resulting in sub-planes having a same resolution, and
wherein each pixel in the input image only appears in one of the sub-planes.

32. The image decoding method of claim 31, wherein the bitstream includes the motion vectors for the selected sub-plane among motion vectors selected in interprediction-encoding of the divided sub-planes.

33. The image decoding method of claim 31, further comprising reconstructing the input image by performing inverse sub-sampling on the interprediction-decoded sub-planes.

34. An image decoder comprising:
an image data extraction device which receives an encoded bitstream including image data obtained by selecting one of sub-planes of an input image obtained by sub-sampling the input image and performing interprediction-encoding on the selected sub-plane, image data obtained by performing interprediction-encoding on the remaining sub-planes based on motion vectors selected in interprediction-encoding of the selected sub-plane, and motion vectors for the selected sub-plane, and which extracts the image data for the interprediction-encoded sub-planes and the motion vectors for the selected sub-plane from the received bitstream; and
an interprediction-decoding unit performing interprediction-decoding on the extracted image data for the interprediction-encoded sub-planes using the extracted motion vectors for the selected sub-plane, wherein the input image is sub-sampled in an interleaved manner resulting in sub-planes having a same resolution, and wherein each pixel in the input image only appears in one of the sub-planes.

35. The image decoder of claim 34, wherein the bitstream includes the motion vectors for the selected sub-plane among motion vectors selected in interprediction-encoding of the divided sub-planes.

36. The image decoder of claim 34, further comprising an image reconstruction unit which reconstructs the input image by performing inverse sub-sampling on the interprediction-decoded sub-planes.

37. An image decoding method comprising:
receiving an encoded bitstream including image data obtained by generating a reference sub-plane for a current image based on a plurality of sub-planes of an input image obtained by sub-sampling the input image, performing interprediction-encoding on the generated reference sub-plane for the current image, and performing interprediction-encoding on remaining sub-planes based on motion vectors selected in interprediction-encoding of the generated reference sub-plane and motion vectors obtained in interprediction-encoding of a selected sub-plane;
extracting the image data for the interprediction-encoded sub-planes and motion vectors for the generated reference sub-plane from the received bitstream; and
performing interprediction-decoding on the extracted image data of the divided sub-planes using the extracted motion vectors,
wherein the input image is sub-sampled in an interleaved manner resulting in sub planes having a same resolution, and
wherein each pixel in the input image only appears in one of the sub-planes.

38. The image decoding method of claim 37, wherein the bitstream includes the motion vectors selected in interprediction-encoding of the generated reference sub-plane among motion vectors for the interprediction-encoding of the divided sub-planes.

39. The image decoding method of claim 37, further comprising reconstructing the current image by performing inverse sub-sampling on the interprediction-decoded sub-planes.

40. The image decoding method of claim 37, wherein the interprediction-encoding of the generated reference sub-plane is performed by referring to a reference sub-plane for a reference image generated in the same manner as the generated reference sub-plane for the current image.

41. An image decoder comprising:
an image data extraction device which receives an encoded bitstream including image data obtained by generating a reference sub-plane for a current image based on a plurality of sub-planes of an input image obtained by sub-sampling the input image, performing interprediction-encoding on the generated reference sub-plane for the current image, and performing interprediction-encoding on the remaining sub-planes based on motion vectors selected in interprediction-encoding of the generated reference sub-plane and a motion vectors selected in interprediction-encoding of a selected sub-plane, and which extracts the image data for the interprediction-encoded sub-planes and the motion vectors for the generated reference sub-plane from the received bitstream; and an interprediction-decoding unit which performs interprediction-decoding on the extracted image data of the divided sub-planes using the extracted motion vectors,
wherein the input image is sub-sampled in an interleaved manner resulting in sub-planes having a same resolution, and
wherein each pixel in the input image only appears in one of the sub-planes.

42. The image decoder of claim 41, wherein the bitstream includes the motion vectors selected in interprediction-encoding of the generated reference sub-plane among motion vectors for the interprediction-encoding of the divided sub-planes.

43. The image decoder of claim 41, further comprising an image reconstruction unit which reconstructs the current image by performing inverse sub-sampling on the interprediction-decoded sub-planes.

44. The image decoder of claim 41, wherein the interprediction-encoding of the generated reference sub-plane is performed by referring to a reference sub-plane for a reference image generated in the same manner as the generated reference sub-plane for the current image.

45. An image decoding method comprising:
receiving an encoded bitstream including image data obtained by selecting one of sub-planes of an input image obtained by sub-sampling the input image and performing interprediction-encoding on the selected sub-plane, image data obtained by performing interprediction-encoding on the remaining sub-planes using the selected sub-plane as a reference sub-plane, and motion vectors for interprediction-encoding of the divided sub-planes;
extracting the image data for the interprediction-encoded sub-planes and the motion vectors for the divided sub-planes from the received bitstream;
performing interprediction-decoding on the extracted image data for the selected sub-plane; and
performing interprediction-decoding on the extracted image data for the remaining sub-planes using the interprediction-decoded sub-plane as a reference sub-plane,
wherein the input image is sub-sampled in an interleaved manner resulting in sub-planes having a same resolution, and
wherein each pixel in the input image only appears in one of the sub-planes.

46. The image decoding method of claim 45, wherein the bitstream includes the motion vectors for the selected sub-plane among the motion vectors for interprediction-encoding of the divided sub-planes.

47. The image decoding method of claim 45, further comprising reconstructing the input image by performing inverse sub-sampling on the interprediction-decoded sub-planes.

48. An image decoder comprising:
an image data extraction device which receives an encoded bitstream including image data obtained by selecting one of sub-planes of an input image obtained by sub-sampling the input image and performing interprediction-encoding on the selected sub-plane, image data obtained by performing interprediction-encoding on remaining sub-planes using the selected sub-plane as a reference sub-plane, and motion vectors for interprediction-encoding of the divided sub-planes, and extracting the image data for the interprediction-encoded sub-planes and the motion vectors for the divided sub-planes from the received bitstream; and
an interprediction-decoding unit which performs interprediction-decoding on the extracted image data for the selected sub-plane and which performs interprediction-decoding on the extracted image data for the remaining sub-planes using the interprediction-decoded sub-plane as a reference sub-plane, wherein the input image is sub-sampled in an interleaved manner resulting in sub-planes having a same resolution, and wherein each pixel in the input image only appears in one of the sub-planes.

49. The image decoder of claim 48, wherein the bitstream includes the motion vectors for the selected sub-plane among the motion vectors for interprediction-encoding of the divided sub-planes.

50. The image decoder of claim 48, further comprising an image reconstruction unit reconstructing the input image by performing inverse sub-sampling on the interprediction-decoded sub-planes.

51. An image decoding method comprising:

receiving an encoded bitstream including image data obtained by performing first interprediction-encoding on a plurality of sub-planes of an input image obtained by sub-sampling the input image, selecting one of the sub-planes that undergo the first interprediction-encoding, and performing second interprediction-encoding on remaining sub-planes using the selected sub-plane that undergoes the first interprediction-encoding as a reference sub-plane, image data for the selected sub-plane, and motion vectors selected in the first interprediction-encoding of the divided sub-planes;

extracting the image data for the interprediction-encoded sub-planes and the motion vectors for the interprediction-encoded sub-planes from the received bitstream;

performing first interprediction-decoding on the image data for the remaining sub-planes using the extracted image data for the selected sub-plane as a reference image; and performing second interprediction-decoding on the image data for the selected sub-plane and the image data for the remaining sub-planes that undergo the first interprediction-decoding using the extracted motion vectors, wherein the input image is sub-sampled in an interleaved manner resulting in sub-planes having a same resolution, and wherein each pixel in the input image only appears in one of the sub-planes.

52. The image decoding method of claim 51, wherein the second interprediction-encoding comprises obtaining a residue between the selected sub-plane that undergoes the first interprediction-encoding and the remaining sub-planes that undergo the first interprediction-encoding.

53. The image decoding method of claim 52, wherein the first interprediction-decoding comprises adding the image data for the selected sub-plane to the image data for the remaining sub-planes.

54. The image decoding method of claim 51, further comprising reconstructing the input image by performing inverse sub-sampling on the interprediction-decoded sub-planes.

55. The image decoding method of claim 51, wherein the first interprediction-decoding corresponds to the second interprediction-encoding, and the second interprediction-decoding corresponds to the first interprediction-encoding.

56. An image decoder comprising:

an image data extraction device which receives an encoded bitstream including image data obtained by performing first interprediction-encoding on a plurality of sub-planes of an input image obtained by sub-sampling the input image, selecting one of the sub-planes that undergo the first interprediction-encoding, and performing second interprediction-encoding on remaining sub-planes using the selected sub-plane that undergoes the first interprediction-encoding as a reference sub-plane, image data for the selected sub-plane, and motion vectors selected in the first interprediction-encoding of the divided sub-planes, and which extracts the image data for the interprediction-encoded sub-planes and the motion vectors for the interprediction-encoded sub-planes from the received bitstream;

a first interprediction-decoding unit which performs first interprediction-decoding on the image data for the remaining sub-planes using the extracted image data for the selected sub-plane as a reference image; and a second interprediction-decoding unit which performs second interprediction-decoding on the image data for the selected sub-plane and the image data for the remaining sub-planes that undergo the first interprediction-decoding using the extracted motion vectors, wherein the input image is sub-sampled in an interleaved manner resulting in divided sub-planes having a same resolution, and wherein each pixel in the input image only appears in one of the divided sub-planes.

57. The image decoder of claim 56, wherein the second interprediction-encoding comprises obtaining a residue between the selected sub-plane that undergoes the first interprediction-encoding and the remaining sub-planes that undergo the first interprediction-encoding.

58. The image decoder of claim 57, wherein the first interprediction-decoding comprises adding the image data for the selected sub-plane to the image data for the remaining sub-planes.

59. The image decoder of claim 56, further comprising an image reconstruction unit which reconstructs the input image by performing inverse sub-sampling on the interprediction-decoded sub-planes.

60. The image decoder of claim 56, wherein the first interprediction-decoding corresponds to the second interprediction-encoding, and the second interprediction-decoding corresponds to the first interprediction-encoding.

61. A non-transitory computer-readable recording medium having recorded thereon a program for causing a computer to execute an image encoding method of claim 1.

62. A non-transitory computer-readable recording medium having recorded thereon a program for causing a computer to execute an image encoding method of claim 7.

63. A non-transitory computer-readable recording medium having recorded thereon a program for causing a computer to execute an image encoding method of claim 17.

64. A non-transitory computer-readable recording medium having recorded thereon a program for causing a computer to execute an image encoding method of claim 23.

65. A non-transitory computer-readable recording medium having recorded thereon a program for causing a computer to execute an image decoding method of claim 31.

66. A non-transitory computer-readable recording medium having recorded thereon a program for causing a computer to execute an image decoding method of claim 37.

67. A non-transitory computer-readable recording medium having recorded thereon a program for causing a computer to execute an image decoding method of claim 45.

68. A non-transitory computer-readable recording medium having recorded thereon a program for causing a computer to execute an image decoding method of claim 51.

* * * * *